United States Patent [19]

Armstrong

[11] 4,070,279
[45] Jan. 24, 1978

[54] EDUCTOR FOR DISSOLVING GASES IN LIQUIDS

[76] Inventor: Edward T. Armstrong, 490 Pepperidge Tree Terrace, Butler, N.J. 07405

[21] Appl. No.: 722,590

[22] Filed: Sept. 13, 1976

[51] Int. Cl.² .......................... C02C 1/12; C02C 5/04; C02C 5/10; C02B 1/34
[52] U.S. Cl. ........................ 210/14; 210/15; 210/63 R; 210/221 R; 261/29; 261/77; 261/93; 261/124; 261/DIG. 77; 239/9; 239/430; 239/DIG. 21
[58] Field of Search .................. 210/59, 63 R, 14, 15, 210/220, 221 R; 261/29, 36, 121 R, 123, 124, 77, DIG. 75, 93; 239/8, 9, 428.5, 430, DIG. 21

[56] References Cited

U.S. PATENT DOCUMENTS

| | | | |
|---|---|---|---|
| 2,479,403 | 8/1949 | Powers | 261/124 |
| 3,043,433 | 7/1962 | Singer | 210/14 |
| 3,183,065 | 5/1965 | DeBolt | 261/124 |
| 3,220,706 | 11/1965 | Valclespino | 261/124 |
| 3,415,378 | 12/1968 | Fukuda | 210/220 |
| 3,452,966 | 7/1969 | Smolski | 261/124 |
| 3,640,516 | 2/1972 | Willinger | 261/DIG. 75 |
| 3,643,403 | 2/1976 | Speece | 261/DIG. 75 |
| 3,671,022 | 6/1972 | Laird | 261/93 |
| 3,677,936 | 7/1972 | Bastiaanse | 261/124 |
| 3,696,029 | 10/1972 | Walker | 210/220 |
| 3,696,929 | 10/1972 | Shah | 210/220 |
| 3,778,038 | 12/1973 | Eversole | 261/DIG. 78 |
| 3,794,303 | 2/1974 | Hirshon | 261/DIG. 75 |
| 3,826,742 | 7/1974 | Kirk | 210/220 |
| 3,840,216 | 10/1974 | Smith | 210/63 |
| 3,853,764 | 12/1974 | Armstrong | 210/195 S |
| 3,855,367 | 12/1974 | Webb | 261/77 |
| 3,865,908 | 2/1975 | Hirshon | 210/220 |
| 3,938,738 | 2/1976 | Nagel | 261/77 |
| 3,968,086 | 7/1976 | Romanowski | 211/77 |

Primary Examiner—Wilbur L. Bascomb, Jr.
Assistant Examiner—Ernest G. Therkorn
Attorney, Agent, or Firm—Oldham & Oldham Co.

[57] ABSTRACT

An apparatus for dissolving at least one gas in a liquid comprises an eductor submerged in a liquid, desirably in combination with a high turbulence mixing device, so that synergistic results are obtained. The inlet portion of the eductor generally has an inward convergence towards a throat. The outlet portion of the eductor has an outward divergence. A diffuser which generally carries the gas mixed with a liquid extends through the eductor inlet portion and through the throat portion into the outlet portion. In a desired embodiment, the diffuser is connected or attached to a high turbulence mixing device such as desirably, a flat plate orifice in a conduit. An injection tube extends through the flat plate orifice downstream into the conduit pipe and injects a gas into the liquid to produce a gas-liquid mixture.

The apparatus dissolves an exceedingly high amount of gas into a liquid and requires very low amounts of energy. In one aspect, the eductors may be placed vertically; in another aspect the eductors may be inclined within a tank, lagoon, and the like to impart a directed flow pattern thereto.

63 Claims, 11 Drawing Figures

SUBMERGENCE DEPTH, FT.

$C_F$ = GAS FEED RATIO $C_S$ = GAS FEED RATIO TO SATURATE $O_2$ (AT 100% EFFICIENCY)

$C_F/C_S$ = 1.3 MEANS GAS FEED IS 1.3 TIMES THAT TO SATURATE $O_2$

EDUCTOR FOR DISSOLVING GASES IN LIQUIDS

BACKGROUND OF THE INVENTION

The present invention relates to an apparatus comprising an eductor for dissolving a gas in a liquid. More specifically, the present invention relates to an efficient apparatus comprising an eductor in combination with an upstream flat plate orifice in-line mixing device to produce an extremely synergistic increase in the amount of a gas dissolved in a liquid.

Heretofore, numerous different types of mixing devices have been utilized to aerate a liquid or increase the amount of a gas dissolved in the liquid. Such devices have been used in several fields including the waste treatment field wherein air or oxygen is usually added to waste water in aerobic processes to lagoons, equalization basins, dechlorinated effluent, holding tanks, and the like. Generally, the efficiency of the prior art devices is extremely low usually ranging from 3 percent to only about 7 or 8 percent. However, according to the present invention, an aeration efficiency of the amount of gas dissolved compared to the amount of gas added to a liquid is at least 20 or 30 percent and can range up to 90 percent and even 100 percent.

An example of a particular prior art air diffuser unit for aerating sewage is set forth in U.S. Pat. No. 3,441,216 granted Apr. 29, 1969 to R. J. Good. In this patent, a cage having a head is completely immersed in sewage. The head has a hole for the flow of air therethrough to an annular array of rods having their ends secured to the head. A fabric sock extends over the rods and serves as a diffuser for injecting air into the sewage effluent. This patent is not pertinent in that it relates to a totally different structure as well as concept.

Another patent of interest in U.S. Pat. No. 3,865,721, granted Feb. 11, 1975 to Joseph R. Kaelin. This patent relates to a method of introducing circulating oxygen or air in the liquid present in an activated sludge tank of a waste treatment plant to prevent sludge settlement. Basically, this device relates to an annular cylindrical part located in the basin. A shaft, which is connected to a motor, has an end extending into the annular cylinder with blades located on this end. A feed pipe extends upwardly into the lower end of the cylinder and generally carries activated sludge therein. Additionally, feed pipes of oxygen or air are introduced either into the feed pipe or the bottom of the annular cylinder. Thus, upon activation of the motor, the blades or propellers tend to aerate the liquid. This patent is not pertinent in that it does not contain applicant's specific structure for an eductor and furthermore lacks any suggestion of combination with an in-line mixing device such as a flat plate orifice.

SUMMARY OF THE INVENTION

It is an object of the present invention to provide an apparatus and method thereof for dissolving at least a gas in a liquid.

It is another object of the present invention to provide an apparatus and method thereof for dissolving a gas in a liquid, as above, wherein an eductor is utilized to mix a gas-liquid mixture in a liquid.

It is a further object of the present invention to provide an apparatus and method thereof for dissolving a gas in a liquid, as above, in combination with a high turbulence mixing device.

It is an additional object of the present invention to provide an apparatus and method thereof for dissolving a gas in a liquid, as above, wherein said high turbulence mixing device is an in-line flat plate orifice.

It is yet another object of the present invention to provide an apparatus and method thereof for dissolving a gas in a liquid, as above, wherein the amount of gas added ranges from a very small fraction of the saturation limit to several times the saturation limit of the particular gas in the particular liquid.

It is yet another object of the present invention to provide an apparatus and method thereof for dissolving a gas in a liquid, as above, which is very efficient and requires very low amounts of energy.

It is yet another object of the present invention to provide an apparatus and method thereof for dissolving a gas in a liquid, as above, wherein said gas-liquid mixture is added to said eductor through a diffuser, and the throat diameter of said eductor ranges from about 2 to about 4 times the internal diameter of said diffuser.

It is yet another object of the present invention to provide an apparatus and method thereof for dissolving a gas in a liquid, as above, wherein the flat plate orifice diameter ranges from about 0.5 to about 0.95 of the conduit or diffuser plate.

It is a yet further object of the present invention to provide an apparatus and method thereof for dissolving a gas in a liquid, as above, wherein the gas can be air, which of course contains oxygen, oxygen, ozone in air or oxygen, sulfur dioxide, carbon dioxide, and the like.

It is yet another object of the present invention to provide an apparatus and method thereof for dissolving a gas in a liquid, as above, wherein the eductor and flat plate orifice apparatus desirably is used in liquid processing.

In general, an apparatus for dissolving a gas in a liquid, comprises, an eductor, said eductor having an inlet portion, and outlet portion, and a throat portion, said throat portion located at the junction of said inlet portion and said outlet portion, said inlet portion having an inward convergence towards said throat, said outlet portion having an outward divergence away from said throat, a diffuser for carrying at least a gas, said diffuser having a tip, and said tip extending through said eductor inlet portion, said throat portion, and into said outlet portion.

Additionally, an eductor, as set forth in the paragraph immediately above, includes a high turbulence mixing device upstream from said diffuser, said high turbulence mixing device mixing a gas in a liquid. Additionally, the amount of gas fed to the liquid ranges from about 0.1 to about 5.0 times the saturation limit of said gas in said liquid.

The present invention also relates to a method for dissolving a gas in a liquid, comprising, the steps of, mixing a gas-liquid mixture with a liquid in an eductor, said eductor having an inlet portion, an outlet portion, and a throat portion, said throat portion located at the junction of said inlet portion and said outlet portion, said inlet portion having an inward convergence towards said throat, said outward portion having an outward divergence away from said throat, a diffuser for carrying said gas-liquid mixture through said eductor inlet portion, said throat portion, and into said outlet portion.

Additionally, the present invention relates to the eductor mixing step as set forth in the paragraph immediately above and also includes injecting a gas into the vicinity of the in-line high turbulence causing device to produce a gas-liquid mixture, and feeding said gas-liquid mixture to said eductor.

Still further, the invention includes adding an amount of gas to the liquid ranging from about 0.1 to about 5.0 times the saturation limit of the gas in said liquid.

PREFERRED EMBODIMENTS OF THE INVENTION

According to the concepts of the present invention, a large synergistic increase in the amount of a gas dissolved in a liquid is obtained. The increase occurs through the utilization of an eductor in combination with a high turbulence producing device such as a flat plate orifice which is located in a conduit carrying a liquid. The gas is added in the vicinity of the flat plate orifice to produce a gas-liquid mixture. This mixture is then fed through a pipe to an eductor and it is injected therein through a diffuser positioned in the eductor. The injected flow in the eductor causes an induced flow of liquid in the surrounding environment into the eductor. The contact of the induced flow with the diffuser flow creates further mixing and dissolving of the gas into the liquid. The liquid fed to the high turbulence causing device is generally obtained from the same environment in which the eductors are located which can be a pond, tank, equalization basin, or the like. Since the apparatus and method involves generally mixing elements, the present invention generally applies to dissolving any type of fluid in a fluid including dissolving a liquid in a liquid, a gas in a liquid, or a mixture of gases in a liquid.

The present invention will be discussed in regard to the treatment of a waste stream as in a waste water treatment facility utilizing air or oxygen. Due to the highly efficient nature of the invention, the energy requirement for pumping and air compression compared to energy required for conventional processes, is greatly reduced.

Figure 1:
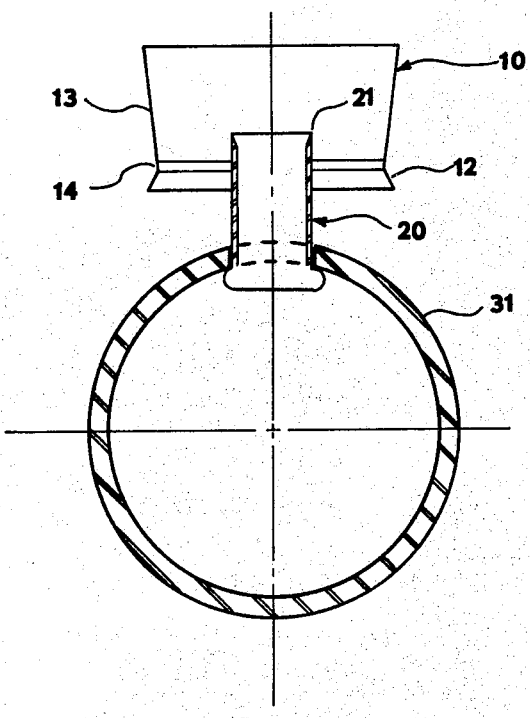
FIG. 1 is a cross sectional view of an eductor according to the concepts of the present invention.

Considering first the eductor, a specific example is shown in FIG. 1 and generally is indicated by the numeral 10. Eductor 10 generally has three portions, namely an inlet portion 12, an outlet portion 13, and a throat portion 14 located at the junction of the inlet and outlet portion. As apparent from FIG. 1, the inlet portion generally has an inward convergence towards the throat. That is, the sides of inlet portion 12 slope inwardly toward the center line or axis of the eductor. It has been found that the angle of the inward convergence is generally not critical and the total convergence between conical elements on a diameter can generally range from about 30° to about 90°. That is, the convergence of a particular side portion from the central axis will vary from about 15° to about 45°. A suitable total convergence has been found to be about 60°, which is a particular side divergence of approximately 30°.

The outlet portion generally has a total upward divergence of from about 10° to about 30° with a specific side, as shown by the section view of FIG. 1, having an outward divergence from the center line ranging from about 5° to about 15°. A more desirable total range extends from 10° to about 20°. The preferred total divergence is desirably approximately 14° or an outward divergence from the center line of 7°.

The length of the inlet portion and the outlet portion is generally not critical so long as a sufficient length exists such that turbulence flow is created in the eductor. Thus, a minimal outlet portion length can be about ½ of the throat of the diameter with a minimum inlet portion length being about 1/10 of the throat diameter. Typical lengths are set forth in Table A.

A diffuser, generally indicated by the numeral 20, extends into the eductor preferably along the axis or center line of the eductor and has an end portion or tip 21. The diffuser, which generally can be a conduit such as a pipe, carries a gas-liquid mixture of the portion of the gas being dissolved in the liquid. The diffuser tip section internally is reamed to about 7° total cone angle. The extension of the tip beyond the throat portion of the eductor can be from about 0.25 to about 0.50 throat diameters with a desirable range extending from about 0.35 to about 0.39 throat diameters. A preferred diffuser tip extension exists at approximately 0.375 throat diameters into the outlet portion.

The internal diameter of diffuser 20 is generally based upon the throat diameter of the eductor. Generally, a desirable range of the throat is from about 2 to about 4 times the internal diameter of the diffuser with a preferred range being approximately 3. Concerning the actual internal diameter of the diffuser, it, of course, can vary from very small fractions of an inch to any number of feet. However, as a practical consideration, an internal diameter of ¼ inch to about 20 inches is suitable with diameters of from about 1 inch to about 12 inches being very practical. Hence, the throat size of the eductor will vary accordingly. For the preferred ratio, this will be from 3 to 36 inches.

TABLE A
RELATIONSHIP OF DIFFUSER DIAMETER, THROAT DIAMETER, AND EDUCTOR DIVERGENCE HEIGHT [1]

| DIFFUSER DIAM.-IN. | THROAT DIAM.-IN. | EDUCTOR DIVERGENCE HEIGHT,-IN; 6 DIVERGENCE |
|---|---|---|
| 1 | 3 | 5 |
| 2 | 6 | 6¼ |
| 3 | 10 | 7 |
| 4 | 12 | 7¾ |
| 6 | 18 | 8¾ |
| 8 | 24 | 9¼ |
| 10 | 30 | 10 |
| 12 | 36 | 10¾ |

[1]Convergence height is 1¼ inches; 30° inclination with respect to center line; Throat Height is 1 inch.

Figure 5:
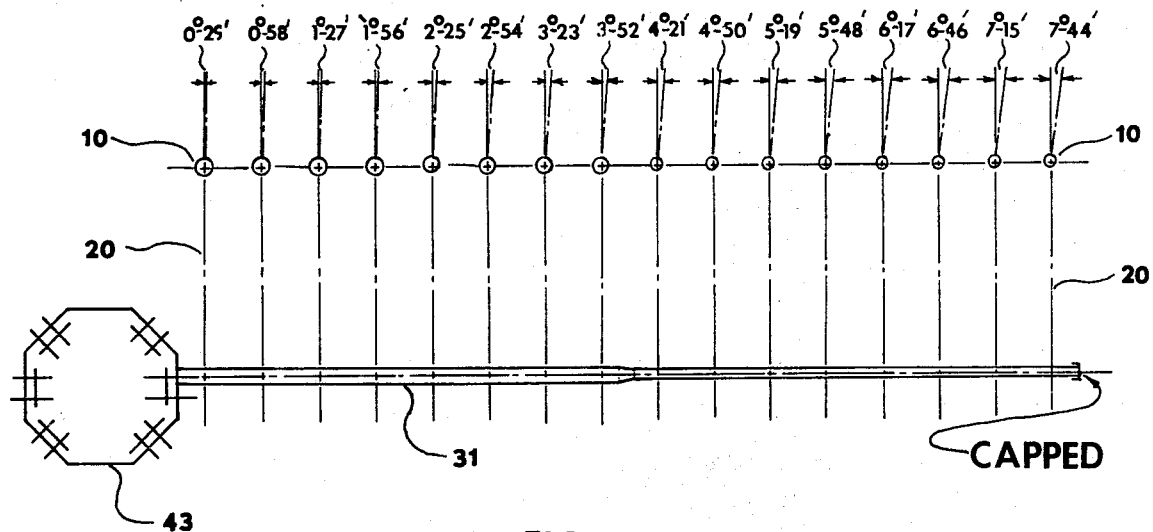
FIG. 5 is a detailed view showing a distributor with several eductors thereon.

The eductor may be positioned with respect to a diffuser in any conventional manner. As shown in FIG. 1, diffuser pipe 20 is attached to a larger conduit 31 in any conventional manner, as by threads, since a number of diffusers can exist on the conduit and in an arrangement as shown in FIG. 5. In any event, eductor 10 may be attached by two or more fin-like braces (not shown) to diffuser 20 which can be screwed into conduit 31 or fastened by any means which ensures fastening. In stabilizing the eductor, care should be taken such that any braces, etc., (not shown) provide clear passage and do not obstruct the flow of the liquid from the tank through the eductor.

Although the eductor may be used to further dissolve an air-liquid mixture supplied by the diffuser into a liquid, it may contain solely a gas stream in the diffuser which is then mixed and dissolved into a liquid through the eductor. However, the former method is preferred. Additionally, it has been found that when the eductor is utilized in combination with a high turbulence device which mixes and dissolves a gas into a liquid stream, as in the former method, synergistic results are produced with regard to the overall amount of gas dissolved into a liquid. The increase obtained is truly synergistic in that the results are in excess of any additive combination and are far in excess of what might be expected by those skilled in the art.

Figure 2:
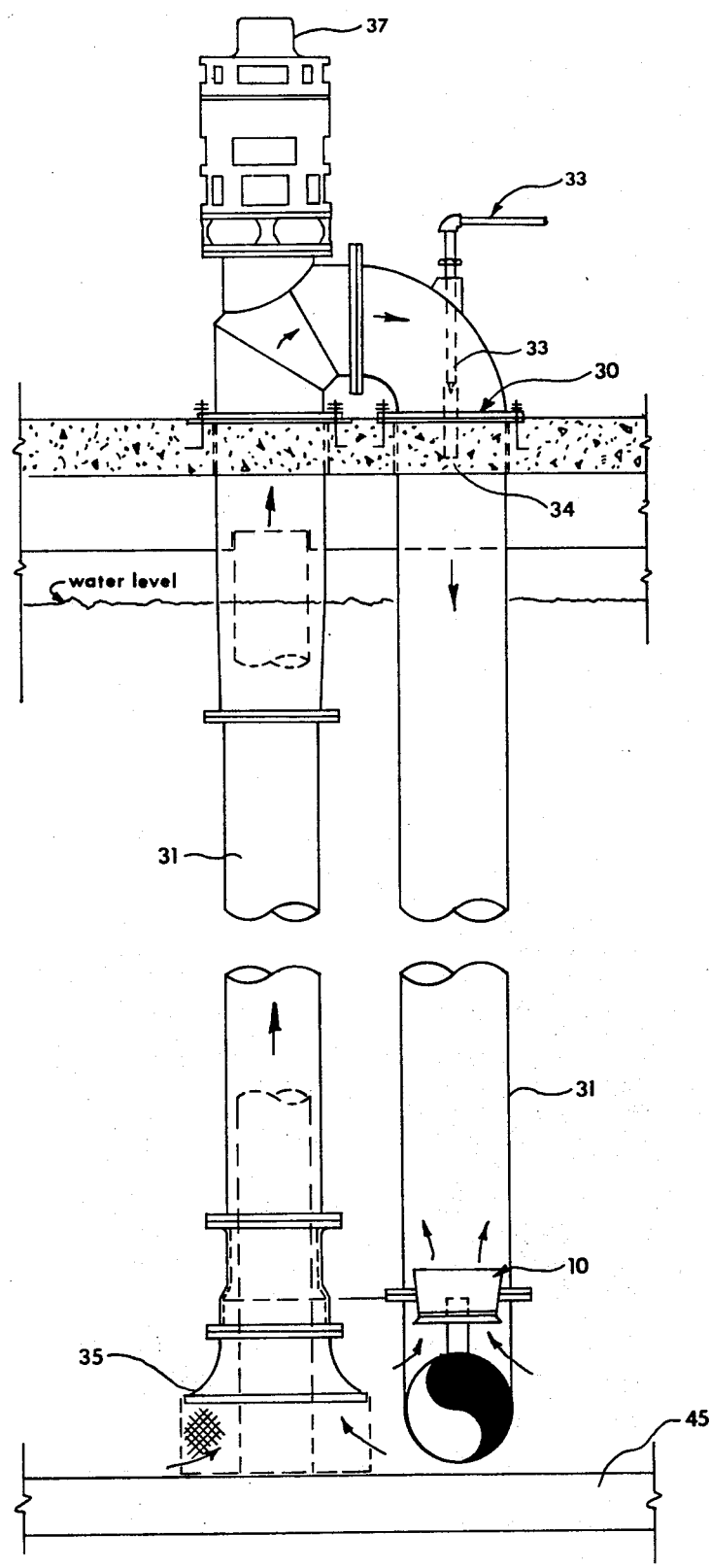
FIG. 2 is a section view showing the pumped recirculating flow and aeration system wherein gas is added to a pipe in the vicinity of a flat plate orifice with the resulting gas mixture then fed to an eductor.

In accordance with a highly desirable aspect of the present invention, a high turbulence causing device is located upstream from the diffuser and desirably in diffuser conduit 25. Referring to FIG. 2, a highly preferred high turbulence causing device, a flat plate orifice, is located in the diffuser conduit such as conveniently between the flange portions of two end portions of a pipe section. The flat plate orifice, generally indicated by the numeral 30, has a diameter of from about 0.5 to about 0.95 of the conduit diameter with a preferred diameter ranging from about 0.8 to about 0.95 of the conduit diameter. Extending into the conduit through the injecting orifice, is a gas injection tube 33. Injection tube 33 has a tip or end portion 34 which extends downstream through the flat plate orifice. A location of injector tip 34 is desirably from about 0.25 to about 0.50 conduit diameters downstream of the orifice and preferably from about 0.35 to about 0.39 diameters downstream. A highly desirable or optimum injection tube tip location is at 0.375 conduit diameters downstream. Generally, the injection tube has a small diameter in comparison to the small conduit such as less than ½ the conduit diameter. Unless the injection tube diameter is large, it is not critical to any mixing, dissolving of the gas, or to the present invention.

Desirably, the flat plate orifice is located at least 40 conduit diameters upstream from the diffuser location on the conduit. If the diffuser is the same size as the conduit and thus serves as a conduit, of course the flat plate orifice is then located at least 40 diameters upstream from the eductor. It has been found that generally only one flat plate orifice need be utilized although a plurality can be utilized. Should the distance between the orifice and the diffuser be rather large, such as 80 conduit diameters or more, then a second flat plate orifice may be utilized as a mixing orifice therebetween to help ensure that the injected gas is kept in a fairly mixed condition when it reaches diffuser 20. Although the flat plate orifice and conduit may be positioned in a horizontal direction or an incline direction, better mixing has been found to be achieved when the orifice-conduit assembly exists in a substantially vertically positioned conduit as shown in FIGS. 2, 3 or 5.

Eductor 10 along with conduit 31 containing the flat plate orifice 30, is generally located in a tank, a lagoon or other body of fluid which contains the liquid. Thus the intake 35 and other conduits will be located in the fluid. In order to force the fluid through the flat plate orifice and then through the diffuser into the eductor, a pump is utilized. Pump 37 may be any conventional pump which is suitable to the particular application.

As apparent from FIGS. 2 and 3, conduit intake 35 is located at a level equal to or below the diffuser tip or the eductor throat portion. Through system design, the amount of friction losses can be held to a 2-foot head and the velocity head at the diffuser may also be held to about 2 feet. In this case, the total head loss is 4 feet. However, with the pump impeller located below the diffuser tip elevation, for example 2 feet as shown in FIG. 2, then this would amount to reducing the head of the system in half. Of course, as should be apparent to one skilled in the art, when conduit intake portion 35 is positioned to a point 4 feet or more lower than the diffuser tip eductor, the imposed head should approach zero. A conduit intake level 2 feet or greater below the diffuser tip is thus desirable.

Figure 3:
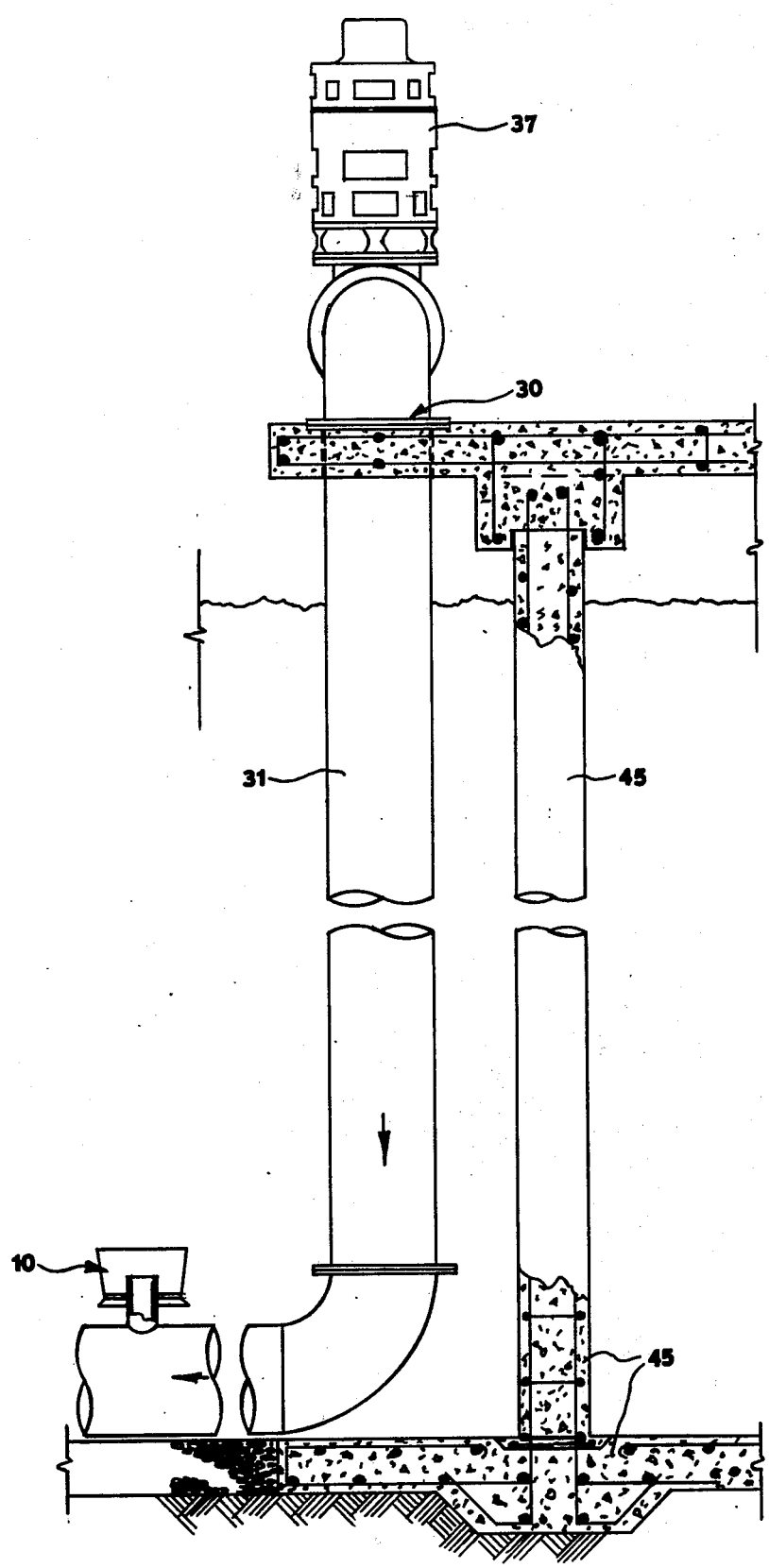
FIG. 3 is a section view similar to FIG. 2.

As shown in FIGS. 2 and 3, the pump may generally be located on a platform or a pier located above the water level so it may be readily maintained, repaired or replaced. The pier support may be constructed according to any conventional manner.

The amount of air added to injector tube 33 can range according to any desirable amount no matter how small or how large. From a pragmatic standpoint, the amount added is generally from 0.1 to about 5.0 times the saturation point of the gas in the liquid. Although when the gas being dissolved is added in very small amounts, two operating characteristics develop. First, the gas-liquid mixing efficiency of the system is high. Second, the increase in gas component concentration dissolved is generally low. This means that the recirculation flow rate must be increased to transfer substantial quantities of gas into solution. The overall result of system operation at very low gas feed rates is to increase recirculating pump capacity and operating pump energy. Concurrently, gas compressor capacity and operating energy are held low. The combined system cost and operating energy may be minimized by feeding gas at higher rates such that the gas component concentration in the in-line mixing system approaches 90 percent saturation or more. Then the gas component concentration leaving the eductor will be about 80 percent to 90 percent. This reduces necessary recirculating pump capacity and operating energy for pumping. A corresponding increase in gas compression capacity and in operating energy occurs. However, the overall expense, capital and operating, is minimized, i.e., optimized in this way.

A preferred range of the amount of gas added exists from about 1 to about 4.0 times the saturation limit of the gas component to be dissolved. When expensive gases are utilized, gas feed rates in excess of four times the saturation limit of the gas component to be dissolved tend to be wasteful. In the case of expensive gases, the amount of feed gas to the flat plate orifice is from about 0.5 to about 4.0 times the saturation limit with the preferred range extending from about 0.50 to about 2.0 times the saturation limit. An example of an expensive gas system is ozone in oxygen or in air, while gases used in this system include: oxygen, ozone in air or oxygen, chlorine, sulfur dioxide, or combinations thereof.

Figure 9:
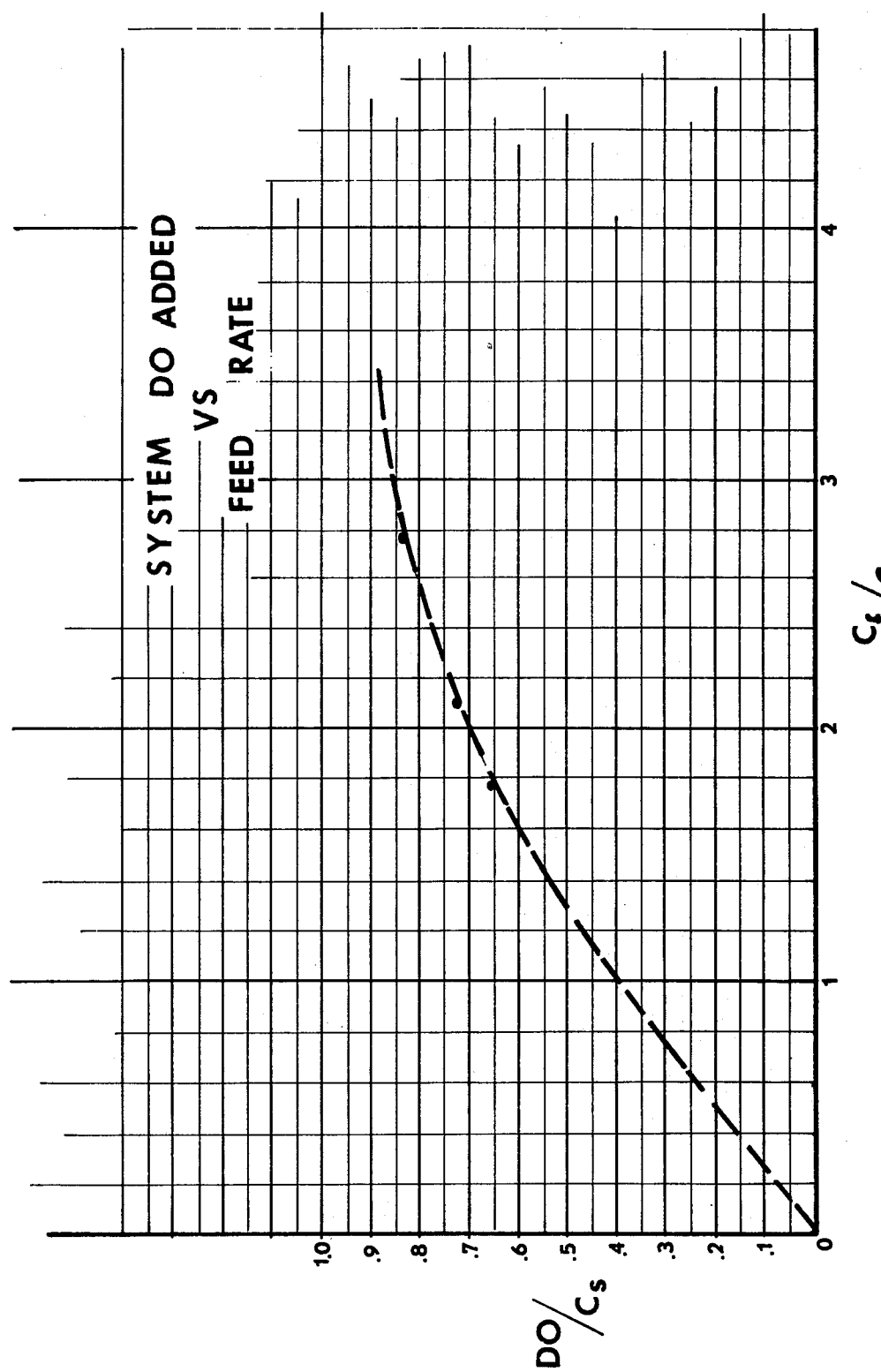
FIG. 9 is a chart showing the amount of dissolved oxygen added to a liquid versus the feed rate of the oxygen contained gas.
Figure 10:
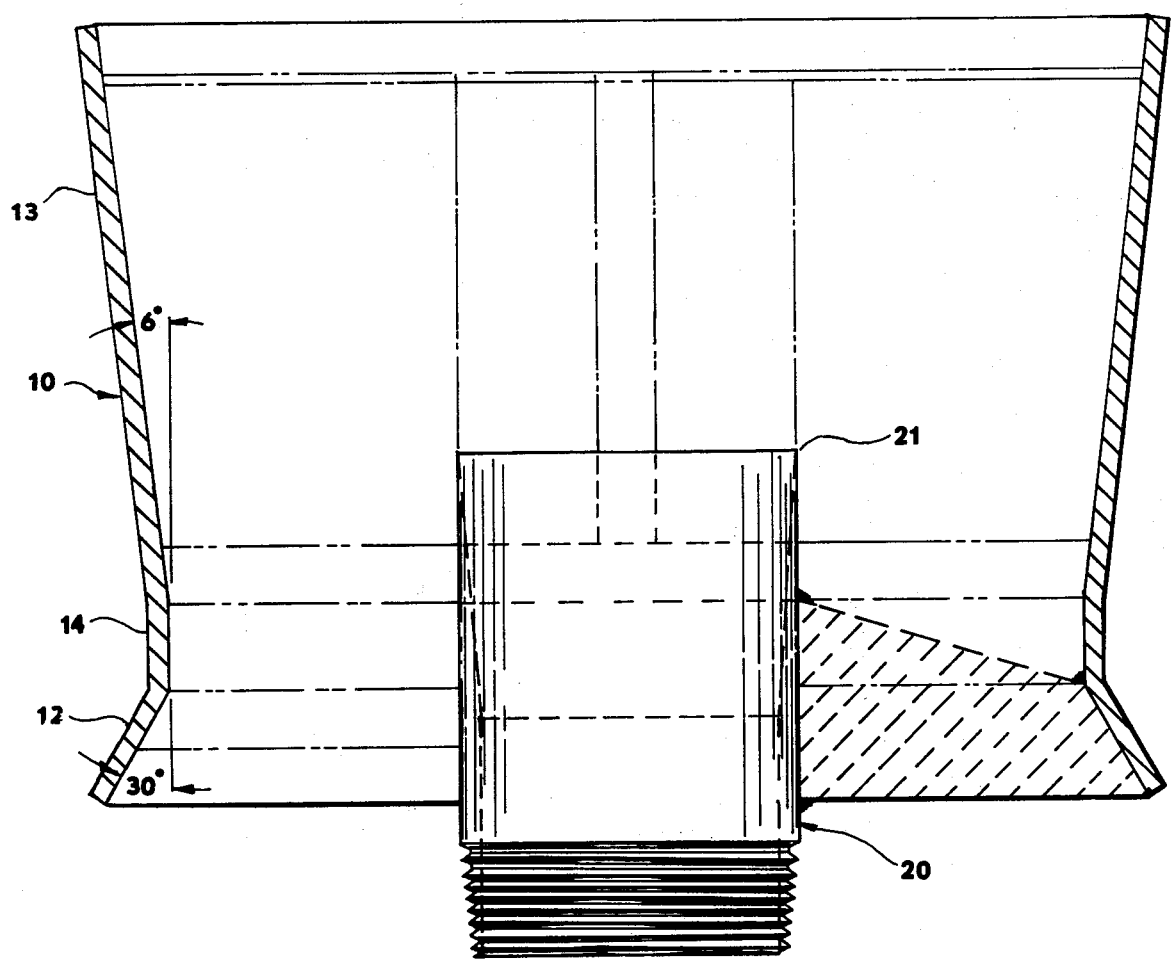
FIG. 10 is an enlarged cross sectional view of an eductor according to the present invention showing preferred outward and inward divergence angles.

As apparent from FIG. 9, the amount of dissolved oxygen increases as the feed rate ($C_f$) increases with regard to saturation feed ($C_s$). However, this increase occurs as the overall efficiency decreases, as noted above. The parameters of the eductors, orifices, etc., are the same as set forth in Example I.

Figure 8:
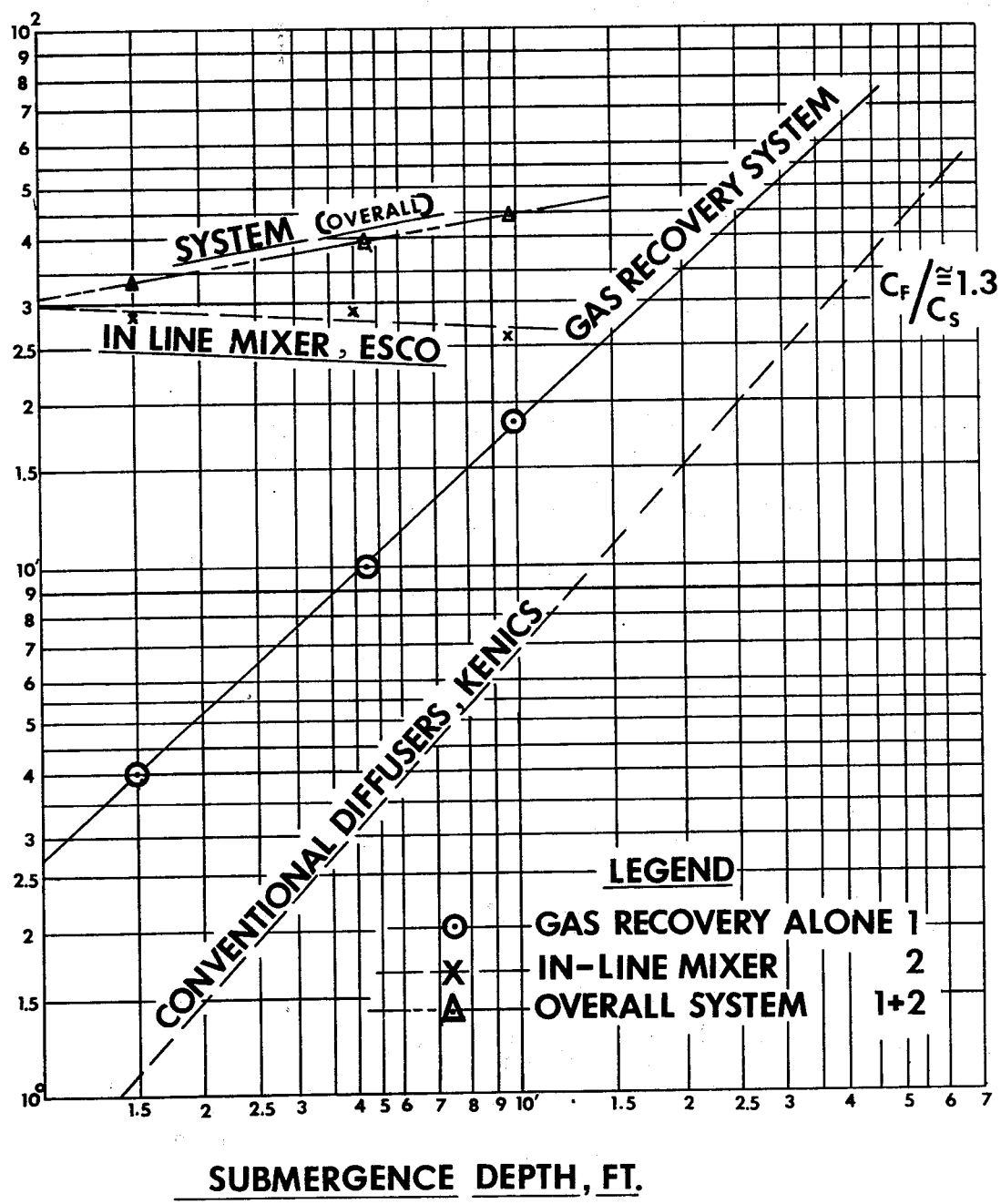
FIG. 8 is a chart comparing the efficiency of the present subsystems and total aeration system with a conventional aeration system at various depths.

As previously noted, the gas added through injection tube 33 is mixed by the flat plate orifice 30. Of course, mixing will dissolve a fair amount of the gas in the liquid. Gas feed rates suffice to provide an excess of gas beyond that dissolved. The resulting gas-liquid mixture which includes undissolved gas therein, is fed through conduit 31 and through diffuser 20 to eductor 10. The natural flow created by the gas-liquid mixture issuing forth from diffuser 20 will induce liquid flow which will be sucked into the eductor so that the gas-liquid mixture is further diluted with liquid, reducing its percentage saturation. In consequence, the second mixing also allows an additional amount of the gas to be dissolved in the liquid, closely approaching saturation of dissolved gas in the total flow from the eductor. The overall efficiency of the high turbulence device in association with the eductor results in a very high amount of gas being dissolved in the combined direct and induced flow which is a truly synergistic result, as shown by the data set forth below and in FIG. 8. The conventional submerged diffuser data is taken from a report entitled "Oxygen Transfer Efficiency in Deep Tanks," Schmidt, F.L., Redmon, D.T., Journal WPCF, November, 1975, pages 2586-2598. A conventional in-line submerged diffuser is described in the kenics report entitled, "Mixing Characteristics of the Kenics Aeration System," Chen S.J., and Fisette, G. R., Kenics Corporation, North Andover, Mass. 01845, Jan. 30, 1975. Both of these articles are hereby fully incorporated by reference with regard to the method of testing, test results, characteristics of the kenics aerator, as well as to the entire teachings or discussions therein. FIG. 8 compares submerged conventional diffuser performance with the counterpart eductor gas recovery system performance of this invention. In addition, the performance of the in-line mixer component of this invention is also shown. The overall system performance, the sum of in-line and eductor gas recovery system performance, is also shown for comparison. Note that remarkable and totally unexpected overall performance develops from the in-line and gas-recovery subsystem components of this invention.

Applicant's copending and allowed U.S. patent application entitled "System for Pollution Suppression," U.S. Ser. No. 531,095, now U.S. Pat. No. 3,998,714 granted on Dec. 21, 1976, is hereby fully incorporated by reference with respect to its entire contents and discussion, including the treatment of waste water and the like.

The apparatus and method for mixing or dissolving a gas in a liquid according to the concepts of the present invention embodies various laws of mechanics, gases, momentum and the like with regard to mixing. Hence, the apparatus and method are applicable to any fluid-fluid system including systems wherein multiple gases or liquids are utilized. As previously noted, the preferred embodiment of the present invention relates to the injection of primarily air or oxygen to a waste water treatment facility although ozone in air or oxygen, sulfur dioxide, carbon dioxide, methane, chlorine, and other commonly used gases or their mixtures may also be utilized. Thus, the present invention finds specific use in the aeration of lagoons, the aeration of equalization basins in which the liquid depth may vary over a great range as from 1 or 2 feet to 20 or 30 feet; to the aeration of activated sludge process of an aerobic unit; to the aeration of aerobic digesters intended to stabilize sludge; to black liquor oxidation of paper mill waste; and to stabilization systems which generally encompass aerobic digesters having brief detention time used to stabilize filtrates, supernatants, and centrates. Often, such process streams are effluent from sludge (anaerobic digester sludge) digestion processes such as vacuum filtration, centrifugation, or slightly clarified sludge (called supernatant). Of course, the process may also be utilized with regard to a purification of potable water and the like wherein the gas such as chlorine or ozone in air or oxygen is added to purify the water.

The efficiency of the present apparatus or process is generally proportional to the depth at which the eductor is located. The efficiency of the in-line mixer subsystem is proportional to absolute pressure. The efficiency of the gas recovery system is a function of the guage pressure, i.e., to the submergence depth of the diffuser. Thus the efficiency $e_d$ of the gas recovery subsystem with regard to the particular depth $d_d$ compared to the efficiency at a reference depth, $d_s e_s$ varies with regard to the power ratio of depths of the first depth, $d_d$ to the reference depth $d_s$. Here, subscript $d$ refers to deep, subscript $s$ to shallow. In other words:

$$e_d/e_s = [d_d/d_s]^n$$

Generally, "$n$" will vary from about 0.7 to slightly more than 1.0 dependent upon the gas and the liquid. However, the value of "$n$" for any system tends to be a constant. See FIG. 8. The effect of depth on submerged diffusers of conventional design is stated by Eckenfelder, in "INDUSTRAIL WATER POLLUTION CONTROL," Eckenfelder, W.W., Jr., McGraw-Hill Book Company, 1966, New York, New York, which is hereby fully incorporated by reference with regard to its entire teachings and discussions, to be represented by "$n$" equal about 0.7. The submerged diffuser data plotted for reference in FIG. 8 exhibits an "$n$" value of very slightly more than 1.0. This data is drawn from the Schmidt reference cited above. The efficiency data for the gas-recovery subsystem of the instant invention is also shown in FIG. 8. For this component of the entire system, the efficiency is properly considered as a function of the FIG. 8 abscissa, submergence depth, a gauge pressure rather than an absolute pressure. The data shown exhibits an "$n$" value of 0.83.

The value is intermediate between the two literature references of 0.7 and 1.0. This is not unexpected since the instant invention injects at the diffuser, in the eductor, a supersaturated gas-liquid pumped fluid comprising a direct flow. This reduces a secondary flow in the eductor of under-saturated liquid. At the diffuser-eductor mixing section, the induced flow absorbs excess gas from the diffuser pumped flow. Thus, the nomenclature gas-recovery subsystem is appropriate.

The invention will be better understood by reference to the following examples.

EXAMPLE I

Considering now a specific example, the effect of air rate and eductors on the aeration system efficiency was determined. A tank was utilized having eductors located at a liquid depth of 5 feet. Air was submitted to the injection tube. The layout of the system was very similar to that shown in FIGS. 2 and 3. The size of the conduit was 4 inches and a 3½ inch diameter flat plate orifice was utilized. The conduit led to a diffuser having a 3-inch internal diameter and the eductor had a 10-inch throat diameter. The eductor outward portion had a total divergence of 14° and the inlet portion of the eductors had an inward convergence of a total of 60°. The diffuser tip was located 0.375 eductor-throat diameters downstream in the eductor. The flow rate through the diffuser was 11.3 feet per second. When the amount of air was 1.17 times the saturation limit, an in-line or orifice mixing efficiency compared to the fed amount of gas dissolved was 26 percent. In the overall system, the efficiency was 58 percent. When the air feed rate was reduced to feed air at 0.6 times the saturation limit for oxygen in the pumped flow, an in-line mixing efficiency of 32 percent was achieved with an overall system efficiency of 75 percent. For a very slow feed rate, that is the amount of air fed was 0.16 times the saturation limit for the oxygen contained in the pumped flow, an in-line mixing efficiency at 38 percent was achieved, with an overall system efficiency of 100 percent. Thus, the overall efficiency increases for low feed rates. However, from a practical standpoint, energy is wasted when a feed rate of the gas is very low, as described previously.

In contrast, when a conventional static mixer was utilized, such as a model produced by Kenics Corporation, an aeration system efficiency for air in water of only 5.1 percent could be obtained. The depth of the static mixer was 5 feet and the gas rate was 1,200 cubic feet per hour. Exact details of this test are reported in articles entitled "Mixing Characteristics of the Kenics Aeration System" and "Oxygen Transfer Efficiency in Deep Tanks," previously noted and incorporated by reference with regard to the testing procedure, results and the like. One of the most efficient, conventional submergence diffuser aeration systems utilized is wrapped Saran tubes. Using Saran tubes with the data from a 12 foot 9 inch submergence to a 5 foot depth using "$n$" as 0.7 power of the depth ratio, the system efficiency of air dissolved in water was 6.5 percent. The manner and performance of this test is reported in "Industrial Water Pollution Control," Eckenfelder, W. W., Jr., McGraw-Hill Book Company, 1966, New York, N.Y. previously incorporated by reference.

Hence, it is readily seen that applicant's apparatus and process represents a greatly significant increase in the amount of oxygen dissolved in water or a gas dissolved in a liquid. Even if the prior art static mixer or Saran wrapped tubes are used in stagewise succession, an efficiency at the most of only 13 percent would have been achieved. Thus, applicant's invention truly represents a great achievement in the art as well as highly unexpected results.

EXAMPLE II

A test was conducted utilizing the exact and identical conditions as Example I, except that oxygen was used instead of air. An in-line mixing efficiency of 50 percent was obtained with an overall system efficiency of 83 percent, when the amount of oxygen was 0.78 of the saturation limit for oxygen in the pumped liquid. When the amount of oxygen was reduced to 0.5 times the saturation limit, an in-line efficiency of 52 percent was achieved with an overall system efficiency of 85 percent. When the amount of oxygen utilized was reduced to 0.25, the in-line mixing efficiency was 63 percent, an overall efficiency of 87 percent. Thus, it can be seen that generally the efficiency obtained using solely oxygen instead of air is generally slightly higher.

EXAMPLE III

Table I sets forth a comparison between the amount of oxygen dissolved utilizing the present invention in comparison with a conventional aerator as well as the amount of power required by each. The various parameters of this test included a 5,500 gallon tank, a conduit having a 4-inch diameter, with a flow rate through the eductor diffuser of 11.3 feet per second. The diameter of the flat plate orifice was 3.75 inches. One eductor was utilized having a 10-inch throat diameter. All the other parameters such as inlet convergence, outlet divergence, extension of injection tubes, and diffuser tube tips are the same as in Example I.

TABLE I

| AERATION SYSTEMS COMPARED - PERFORMANCE AT VARIOUS DEPTHS CONVENTIONAL VERSUS INVENTION - SUBMERGED DIFFUSERS | | | | |
|---|---|---|---|---|
| Relation Among Submergence Depth, Oxygen Rate and Characteristic Ratio For Representative Aerobic Unit Loads (2) | | | | |
| Submergence Depth, Feet [1] | 43.8 | 33.8 | 23.8 | 13.8 |
| Design Capacity, MGD | 0.9 | 2.67 | 8. | 24. |
| BOD to Aerobic Unit, ppm | 240. [3] | 168. | 216. [5] | 180. [6] |
| BOD Reduction, Aerobic, ppm | 205. | 147. | 188. | 160. |
| Oxygen Rate Required, lb day$^{-1}$ [7] | 2154. | 4583. | 18,000. | 45,000. |
| Air Rate Required, lb. sec$^{-1}$ | .12 | .25 | 1.0 | 2.5 |
| Air Rate Required, cfm | 96. | 203. | 800. | 1,991. |
| Air Pressure, psig | 7.5 | 7.5 | 7.5 | 7.5 |
| Air Horsepower | 4.0 | 8.2 | 33. | 82. |
| Air Kilowatts | 2.95 | 6.1 | 24.6 | 61.4 |
| System Depth, feet [8] | 45. | 35. | 25. | 15. |
| System Increase in DO, ppm | 26.8 | 22.8 | 18.3 | 13.5 |
| Pumped Recirculation MGD [9] | 9. | 24. | 118. | 400. |
| Recirculation Horsepower | 8.4 | 22.5 | 111. | 375. |
| Recirculation Kilowatts | 6.3 | 16.8 | 83. | 280. |
| Recirculation kwh day$^{-1}$ | 151. | 403. | 1,992. | 6,720. |

TABLE I-continued
AERATION SYSTEMS COMPARED - PERFORMANCE AT VARIOUS DEPTHS CONVENTIONAL VERSUS INVENTION - SUBMERGED DIFFUSERS
Relation Among Submergence Depth, Oxygen Rate and Characteristic Ratio For Representative Aerobic Unit Loads (2)

| | | | | |
|---|---|---|---|---|
| Compression kwh day$^{-1}$ | 70.8 | 146. | 590. | 1,474. |
| System kwh day$^{-1}$ | 222. | 549. | 2,582. | 8,193. |
| Invention System pounds of O$_2$/kwh | 9.7 | 8.3 | 7.0 | 5.5 |
| Conventional Aeration Capacity Installed, cfm (10) | 1603. | 3410. | 13,066. | 33,360. |
| Air Pressure, psig | 22.5 | 17.5 | 12.5 | 7.5 |
| Aeration HP used (11) | 103. | 184. | 544. | 909. |
| Aeration kwh (12) | 77. | 138. | 405. | 678. |
| Conventional Aeration, pounds of O$_2$/kwh | .83 | .99 | 1.32 | 1.98 |
| Ration, R, Invention/Conventional, O$_2$/kwh | 11.7 | 8.4 | 5.3 | 2.8 |

(1) Submergence Depth is the independent variable. At a given depth, the characteristic ratio of pounds of oxygen per kwh for invention versus conventional is not a function of MGD or oxygen rate. It is a function of depth.
(2) Loads were selected representative of typical processes for BOD reduction.
(3) Residential waste, no primary claifier.
(4) Residential waste.
(5) Industrial and residential waste, activated sludge protected by equalization in primary clarifier and a roughing filter.
(6) Residential waste.
(7) Assumes 1.4 pounds of oxygen per pound of BOD.
(8) Diffuser tip 14-inches above bottom.
(9) Dependent variable directly affected by the depth-gas solubility relation.
(10) Based on 1500 cubic feet of air per pound of BOD.
(11) Based on 1000 cubic feet of air per pound of BOD.
(12) All rates based on aerobic unit only.

As apparent from this table, the present invention dissolved anywhere from 3 times to 12 times the amount of oxygen available in solution from use of a conventional system utilizing the same amount of energy. Thus, the present invention will also yield great reductions in energy expended per pound of gas dissolved comparing energy total in each case. In the invention herein, energy includes that for pumped recirculation and for gas compression. In the usual system, only gas compression is involved; although in the Penberthy-Houdaille system, both pumped recirculation and gas compression is involved. In the latter case, two separate and distinct distribution systems, one for air, one for water, are brought to the eductor location and are there discharged below and outside the envelope of the eductor and are therein mixed. This is another of the conventional systems for which the mixing efficiency and energy requirements are not competitive with those of the instant invention.

The tables of this specification will be better understood by reference to Standard Methods for the Examination of Water Waste Treatment, APHA (American Public Health Association), AWWA (American Waterworks Association), WPCF (Water Pollution Control Federation), 1976 edition, which is hereby incorporated by reference with respect to their entire contents, specifically with regard to items as various methods and techniques for testing aeration equipment. These references set forth the type of water utilized in testing, a method of measuring, computing, and reporting the rate of oxygen uptake, the temperature of the absorbing liquid, the pressure of the absorbing liquid and the geometry of the test tank. Additionally, these references also set forth two fundamental techniques employed in determining the oxygen transfer capability, that is the sulfite-ion pollution test and the reoxygenation technique. Moreover, the exact test procedure and steps are set forth. All of these specific items are hereby incorporated along with any possible mention of determination of pumping requirements and energy requirements.

EXAMPLE IV

Table II sets forth relationship of depth and gas feed rate utilizing an apparatus according to the present invention. The apparatus was utilized in a sewage treatment facility. As apparent from Table II, a greater depth gave a high efficiency.

TABLE II
EFFECT ON DEPTH AND GAS FEED RATE ON SYSTEM PERFORMANCE (1) CYLINDRICAL AEROBIC DIGESTER - STABILIZATION SYSTEM

| RUN NO. | DEPTH, FEET TANK | DEPTH, FEET SUBMERGENCE | IN-LINE P, psig | TANK VOL., g. | TANK T, °C | CFH | AIR FED TO SYSTEM P psig | AIR FED TO SYSTEM T, °C | AIR FED TO SYSTEM SETH | AIR FED TO SYSTEM SCFM |
|---|---|---|---|---|---|---|---|---|---|---|
| A | 11 | 9.5 | 8.6 | 5441 | 34 | 206 | 15.9 | 81 | 246 | 4.10 |
| B | 11 | 9.5 | 8.5 | 5441 | 34 | 160 | 13.9 | 78 | 186.3 | 3.105 |
| C | 11 | 9.5 | 8.5 | 5441 | 34 | 134 | 13.2 | 76.6 | 155.99 | 2.583 |
| D | 11 | 9.5 | 8.5 | 5441 | 33 | 111 | 12.7 | 72 | 128.7 | 2.145 |
| E | 11 | 9.5 | 7.6 | 5441 | 32 | 100 | 11.4 | 61 | 116.89 | 1.948 |
| F | 6 | 4.5 | 5.7 | 2968 | 34 | 85 | 9.4 | 47 | 99.65 | 1.661 |
| G | 6 | 4.5 | 5.7 | 2968 | 34 | 66 | 9.1 | 41 | 78.36 | 1.306 |
| H | 6 | 4.5 | 5.7 | 2968 | 33 | 55 | 8.9 | 45 | 64.21 | 1.070 |
| I | 3 | 1.5 | 4.6 | 1484 | 37 | 79 | 8.3 | 56 | 88.0 | 1.467 |
| J | 3 | 1.5 | 4.6 | 1484 | 36 | 64 | 7.3 | 53 | 71.164 | 1.186 |
| K | 3 | 1.5 | 4.6 | 1484 | 34 | 50 | 7.6 | 48 | 56.21 | .937 |
| L | 3 | 1.5 | 4.5 | 1484 | 34 | 40 | 7.5 | 39 | 46.163 | .769 |

| RUN NO. | FEED SAT'N C$_s$,ppm | FEED RATIO C$_f$/C$_s$ | OXYGEN, lb/hr FED | OXYGEN, lb/hr DISSOLVED SYSTEM | OXYGEN, lb/hr DISSOLVED IN-LINE | OXYGEN, lb/hr RECOVERY | SYSTEM EFFICIENCY E$_s$ | SYSTEM EFFICIENCY E$_m$ | SYSTEM EFFICIENCY E$_e$ | SYSTEM DO Added |
|---|---|---|---|---|---|---|---|---|---|---|
| A | 11.16 | 2.78 | 3,846 | 1.180 | .713 | .467 | .31 | .19 | .12 | 9.2 |
| B | 11.02 | 2.11 | 2.913 | .997 | .638 | .359 | .34 | .22 | .12 | 7.9 |
| C | 11.02 | 1.76 | 2.423 | .895 | .558 | .337 | .37 | .23 | .14 | 7.17 |
| D | 11.3 | 1.42 | 2.012 | .779 | .550 | .229 | .39 | .27 | .12 | 6.31 |

TABLE II-continued
EFFECT ON DEPTH AND GAS FEED RATE ON SYSTEM PERFORMANCE [1]
CYLINDRICAL AEROBIC DIGESTER - STABILIZATION SYSTEM

| | | | | | | | | | | |
|---|---|---|---|---|---|---|---|---|---|---|
| E | 11.17 | 1.31 | 1.828 | .757 | .484 | .273 | .44 | .26 | .18 | 6.16 |
| F | 9.69 | 1.29 | 1.558 | .631 | .749 | .162 | .39 | .29 | .10 | 5.10 |
| G | 9.69 | 1.01 | 1.225 | .475 | .357 | .118 | .35 | .29 | .06 | 3.83 |
| H | 9.93 | 0.81 | 1.004 | .413 | .319 | .094 | .353 | .32 | .03 | 3.28 |
| I | 8.44 | 1.31 | 1.376 | .451 | .394 | .057 | .30 | .29 | .01 | 3.56 |
| J | 8.69 | 1.02 | 1.113 | .381 | .338 | .043 | .34 | .30 | .04 | 3.08 |
| K | 9.12 | 0.77 | .879 | .326 | .294 | .032 | .37 | .33 | .04 | 2.64 |
| L | 9.12 | 0.63 | .722 | .277 | .235 | .042 | .38 | .33 | .05 | 2.16 |

[1] Water flow rate 250 gpm + 20 gpm. One 3-inch diameter diffuser in 10-inch diameter eductor skirt. Aerobic digester tests. Eductor at 0.9 $R_m$, inclined 10° tangentially. In-line mixer, external, in vertical plane, 4-inch diameter, one injecting mixing orifice, 3¾ inch in diameter.

EXAMPLE V

Utilizing the same operating parameters as in Table II, such as the eductor throat diameter, the internal diameter of the diffuser, etc., a series of runs was made to determine the effect of depth and gas rate on performance. Results are set forth in Table III.

TABLE III

SYSTEM DEMONSTRATION DATA SHOWING EFFECT OF DEPTH AND GAS RATE ON PERFORMANCE [1]

| RUN NO. | SUBMERGENCE DEPTH, FT. DIFFUSER | TANK VOLUME GAL. | DISSOLVED OXYGEN, ppm AT P, T SAT'N [1] | LINE IN | LINE OUT | ELAPSED TIME MIN. | $-\text{LOG}_e$ [2] A | SLOPE |
|---|---|---|---|---|---|---|---|---|
| M | 9.5 | 5441 | 11.16 | .40 | 6.1 | 0 | .03650 | |
| | | | | 1.10 | 6.40 | 2 | .10377 | |
| | | | | 2.00 | 6.72 | 4 | .19749 | |
| | | | | 2.71 | 6.94 | 6 | .27817 | |
| | | | | 3.30 | 7.12 | 8 | .35055 | |
| | | | | 3.95 | 7.33 | 10 | .43687 | .03833 |
| N | 9.5 | 5441 | 11.02 | .30 | 5.40 | 0 | .02760 | |
| | | | | 1.30 | 5.88 | 2 | .12553 | |
| | | | | 1.65 | 6.05 | 4 | .16220 | |
| | | | | 2.35 | 6.51 | 6 | .23984 | |
| | | | | 2.85 | 6.71 | 8 | .29924 | |
| | | | | 3.50 | 6.85 | 10 | .38215 | .03323 |
| O | 9.5 | 5441 | 11.02 | .45 | 4.91 | 0 | .04169 | |
| | | | | 1.20 | 5.55 | 2 | .11529 | |
| | | | | 1.74 | 5.73 | 4 | .17185 | |
| | | | | 2.36 | 6.08 | 6 | .24100 | |
| | | | | 2.83 | 6.40 | 8 | .29680 | |
| | | | | 3.35 | 6.58 | 10 | .36240 | .02983 |
| P | 9.5 | 5441 | 11.3 | .10 | 4.50 | 0 | .00889 | |
| | | | | .55 | 4.90 | 2 | .04990 | |
| | | | | 1.40 | 5.30 | 4 | .13227 | |
| | | | | 1.90 | 5.45 | 6 | .18409 | |
| | | | | 2.31 | 5.81 | 8 | .22869 | |
| | | | | 2.80 | 5.94 | 10 | .28474 | .02533 |
| Q | 9.5 | 5441 | 11.17 | .18 | 4.05 | 0 | .01625 | |
| | | | | .75 | 4.60 | 2 | .06950 | |
| | | | | 1.35 | 4.93 | 4 | .12881 | |
| | | | | 1.46 | 5.23 | 6 | .17146 | |
| | | | | 2.20 | 5.50 | 8 | .21935 | |
| | | | | 2.70 | 5.75 | 10 | .27670 | .02488 |
| R | 4.5 | 2968 | 9.69 | .30 | 3.89 | 0 | .03145 | |
| | | | | 1.10 | 4.35 | 2 | .12050 | |
| | | | | 1.93 | 4.70 | 4 | .22211 | |
| | | | | 2.50 | 5.20 | 6 | .29840 | |
| | | | | 3.05 | 5.50 | 8 | .37798 | |
| | | | | 3.55 | 5.80 | 10 | .45627 | .04383 |
| S | 4.5 | 2968 | 9.69 | .43 | 3.28 | 0 | .04539 | |
| | | | | 1.00 | 3.80 | 2 | .10892 | |
| | | | | 1.60 | 4.28 | 4 | .18047 | |
| | | | | 2.14 | 4.45 | 6 | .24955 | |
| | | | | 2.71 | 4.85 | 8 | .32805 | |
| | | | | 3.14 | 5.20 | 10 | .39163 | .03303 |
| T | 4.5 | 2968 | 9.93 | .08 | 2.63 | 0 | .00801 | |
| | | | | .43 | 3.00 | 2 | .04427 | |
| | | | | 1.03 | 3.40 | 4 | .10951 | |
| | | | | 1.68 | 3.90 | 6 | .18535 | |
| | | | | 2.17 | 4.11 | 8 | .24658 | |
| | | | | 2.57 | 4.47 | 10 | .29950 | .02798 |
| U | 1.5 | 1484 | 8.44 | .75 | 3.90 | 0 | .09306 | |
| | | | | 1.85 | 4.65 | 2 | .24743 | |
| | | | | 2.98 | 5.25 | 4 | .43553 | |
| | | | | 3.72 | 5.75 | 6 | .58117 | |
| | | | | 4.45 | 6.15 | 8 | .74919 | |
| | | | | 5.00 | 6.50 | 10 | .89751 | .07191 |
| V | 1.5 | 1484 | 8.69 | .35 | 3.05 | 0 | .04111 | |
| | | | | 1.32 | 3.95 | 2 | .16476 | |
| | | | | 2.31 | 4.52 | 4 | .30900 | |
| | | | | 3.22 | 5.18 | 6 | .46289 | |
| | | | | 3.94 | 5.60 | 8 | .60403 | |
| | | | | 4.47 | 5.90 | 10 | .72234 | .05991 |
| W | 1.5 | 1484 | 9.12 | .35 | 2.70 | 0 | .03913 | |
| | | | | 1.30 | 3.50 | 2 | .15379 | |
| | | | | 2.10 | 4.14 | 4 | .26171 | |
| | | | | 2.95 | 4.72 | 6 | .39077 | |
| | | | | 3.70 | 5.14 | 8 | .52037 | |
| | | | | 4.17 | 5.70 | 10 | .61108 | .04811 |
| X | 1.5 | 1484 | 9.12 | 0.42 | 2.30 | 0 | .04715 | |

TABLE III-continued
SYSTEM DEMONSTRATION DATA SHOWING EFFECT OF DEPTH AND GAS RATE ON PERFORMANCE[1]

|  |  |  |  |  |
|---|---|---|---|---|
| 1.05 | 3.10 | 2 | .12232 |  |
| 1.80 | 3.50 | 4 | .21986 |  |
| 2.60 | 4.10 | 6 | .33560 |  |
| 3.12 | 4.55 | 8 | .41871 |  |
| 3.78 | 5.05 | 10 | .53524 | .04091 |

[1] At in-line mixer pressure and temperature, the saturation DO is listed, $C_r$.
[2] A is the difference ratio, $C_s - C_t - C_o$, where $C_t$ is DO at time t to determine slope. Slope defines the system oxygen transfer rate.

Generally, conventional instrumentation is installed on the individual piers and connected in a conventional manner to help control various parameters of the system. Two areas in which instrumentation can be utilized concerns the dissolved oxygen (DO) content and the turbidity of the liquid at each pier. Thus, instrumentation may be arranged on the piers to maintain the DO at a desirable range. Should the DO be too high, one of the pumps on a particular pier may be shut down. This would leave the remaining pumps operating and thus insure that rotation of the liquid still occurs within a particular cell. On the other hand, should the dissolved oxygen be too low, the instrumentation can then increase the flow of gas fed to the apparatus, that is the flat plate orifice and eductor system, or a shut-down pump and/or a supplemental pump may be initiated. Thus, through these methods, the dissolved oxygen content can be controlled. This can be brought about by initiating one of the shut-down pumps or by bringing a supplemental pump into operation, thereby increasing circulation and insuring uniform solid suspensions in the lagoon.

Similar instrumentation and controls can be applied to the piers located in the activated sludge tanks or lagoons, in various aerobic units, in various aerobic digesters, as well as in various stabilization digesters.

Figure 4:
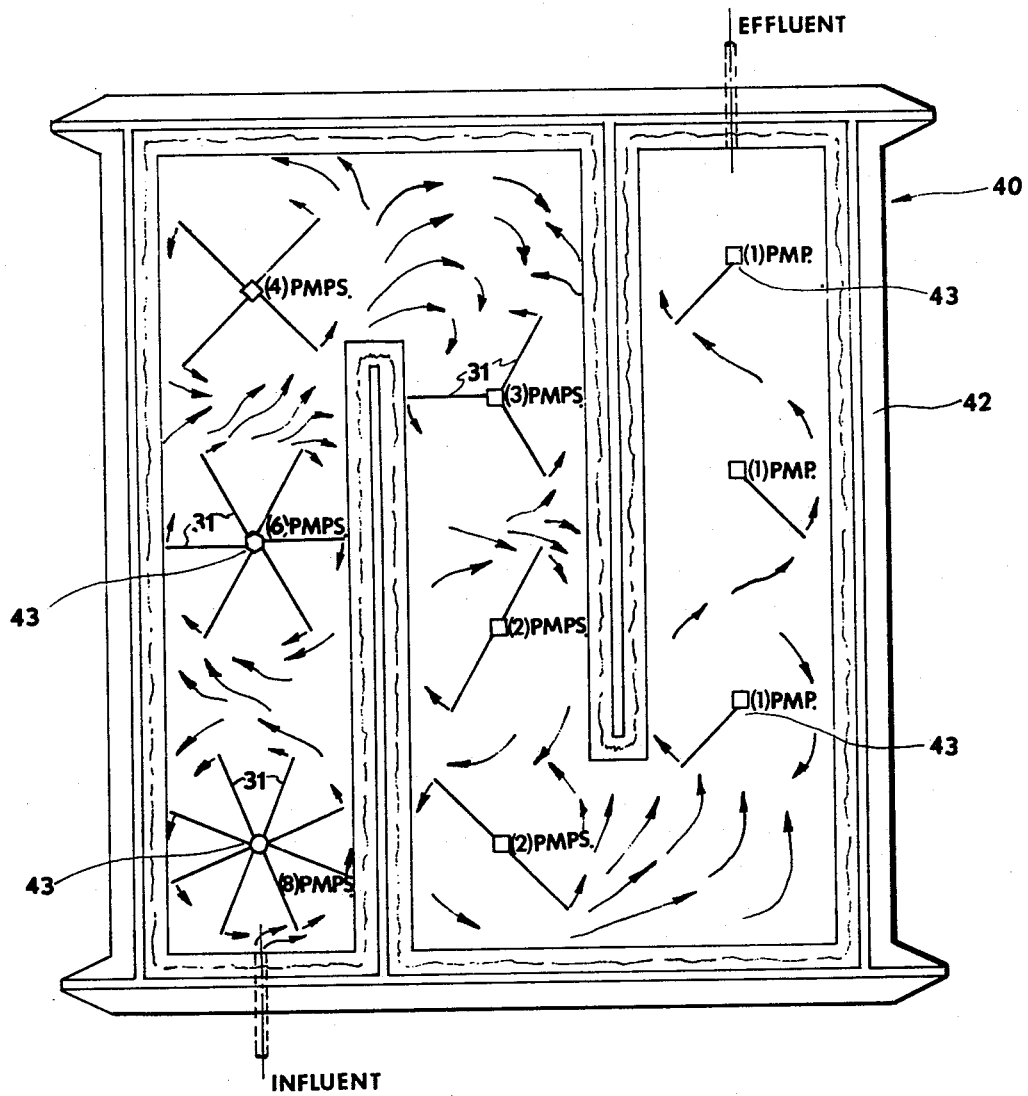
FIG. 4 is a plan view showing the utilization of several pumps and mixing apparatus according to the present invention for treating waste.

The invention may be utilized in a plug flow lagoon as discussed hereinbelow. Generally, such a plug flow lagoon is shown in FIG. 4 and is generally indicated by the numeral 40. It is desirable to generally move the effluent through a series of pier stations or cells so that the BOD of the influent may be gradually reduced. A particular flow diagram is shown in FIG. 4 wherein the lagoon may have walls 4 constructed of concrete, earth or the like. This particular embodiment comprises 9 cells each having a pier station 43. The piers support various pumps and air compressors, as indicated, which pump and aerate the influent through a high turbulence device such as a flat plate orifice then mixing in the pump column and discharging through eductors located in the lagoon. The arrows in FIG. 4 generally show the direction of the flow. FIG. 5 shows a typical conduit or distributor arm connected to a series of eductors. In order to create a flow through the lagoon, eductors may be tilted at a slight angle with regard to the vertical, as in FIG. 5. Generally, the angle increases in FIG. 5 from zero adjacent the pier to approximately 8° at the outermost eductor. This variation tends to create horizontal flow components to move the liquid through the system. Additionally, FIG. 4 shows the suggested location of the piers along the channel centerline, and the fact that the overall lagoon layout is approximately square.

The following discussion is in regard to the plug flow lagoon, as shown in FIG. 4.

PLUG FLOW LAGOON

A plug flow lagoon may be assumed to develop exponential decay of BOD. Exponential means equal percentage reductions in equal increments of time. The desired detention time defines lagoon volume.

Volume is the product of channel area times length. For a given depth, the channel area is proportional to its width. Generally, plug flow lagoon sizing would be based on length-width ratios of 4 to 12.

It is apparent that plug lagoon flow traverses equal lengths in equal intervals of time. Thus, the exponential relation of time described before can be equated to equivalent lengths of lagoon flow.

Figure 7:
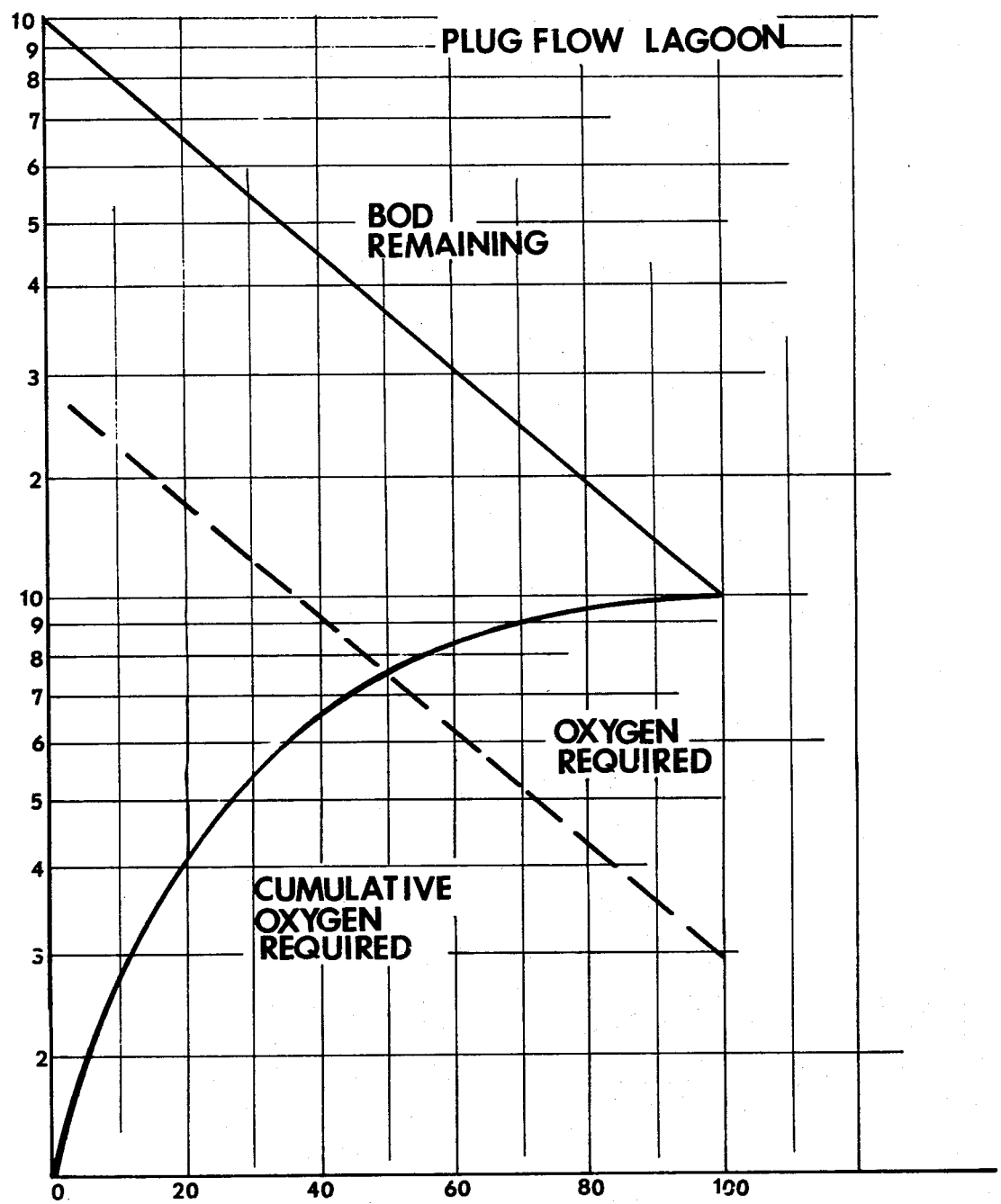
FIG. 7 is a chart for a plug flow lagoon showing the BOD remaining, the oxygen required, and the cumulative oxygen required for various percent of BOD reduction.

Oxygen must be supplied in quantities proportionate to the amount of BOD (Biological Oxygen Demand) reduction. This means that oxygen supply must be decreased as flow progresses through the lagoon. For example, for 10 progressive BOD reductions to 10 percent remaining BOD, the BOD at the end of each channel reach would be as listed next in Table IV and as shown in FIG. 7. Tabular data is shown in FIG. 1.

In this figure, the upper plot shows the exponential BOD — length relation. It follows the expression:

$$BOD_x/BOD_o = e^{-kx/L}$$

Where:
$BOD_x$ is BOD at location x
$BOD_o$ is BOD at x = 0
e is the base of natural logarithsms
k is the attenuation coefficient, 2.3026
L is plug flow lagoon length.

An implication of this relation is that the rate of BOD reduction is proportional to the BOD remaining. For the data plotted, k is determined at x = L, since $e^{-k} = 0.1$. This corresponds to k = 2.302585093.

In the figure, the middle plot shows the exponential oxygen required — length relation. As expected, it parallels the BOD remaining data. This representation is useful and yields the lower plot of FIG. 7.

The plot indicates the cumulative amount of oxygen required as flow traverses the lagoon is also shown in Table IV. Note that to 10 percent travel, 22.8 percent of the total oxygen supply is needed. Twenty-five percent of the oxygen is required in 11 percent travel.

TABLE IV
EXPONENTIAL BOD LENGTH DATA FOR PLUG FLOW

| | % | | | | | | | | | |
|---|---|---|---|---|---|---|---|---|---|---|
| PLUG FLOW TRAVEL, | % | 100.00 | 90.00 | 80.00 | 70.00 | 60.00 | 50.00 | 40.00 | 30.00 | 20.00 | 10.00 |
| BOD REMAINING, | % | 79.44 | 63.11 | 50.13 | 39.83 | 31.63 | 25.13 | 19.97 | 15.86 | 12.60 | 10.00 |
| REACH BOD REMOVED, | % | 20.56 | 16.33 | 12.98 | 10.30 | 8.20 | 6.50 | 5.16 | 4.11 | 3.26 | 2.60 |
| OXYGEN REQUIRED, | % | 22.84 | 18.14 | 14.42 | 11.44 | 9.11 | 7.22 | 5.73 | 4.57 | 3.63 | 2.90 |

Fifty percent of the oxygen is used in traversing 26½ percent of the total lagoon length. Similarly, 75 percent of the oxygen must be supplied in the first 48 percent of lagoon length.

This distribution of oxygen requirements correlates with eductor numbers and spacing required. In the discussed aeration system, the oxygen requirement is satisfied by aeration of recirculation liquid. Thus, the distribution of oxygen requirements for a plug flow lagoon suggests preferred pump locations for aerated recirculation.

If one pump group were to be used, it would be located at the 50 percent cumulative oxygen-required station. This is shown in the figure to be at the 26.4 percent length. On either side of this location, the cumulative recirculation flows would be equal. Obviously, the two lengths are in the ratio 1:3.

For reliability, maintenance logistics, and minimum system cost, it is not believed that an optimum system would utilize one pump. Rather, a number of pumps seems preferable. Pump mounts are recognized as a particular problem. The thought has been advanced that it may be convenient to utilize a typical pump mount which could accommodate a number of pumps.

For illustrative and comparative purposes, a 42 MGD (million gallon a day) lagoon at 20 foot depth may be assumed. For 90 percent reduction in BOD, a 10 to 12 day detention time would be realistic. This facility might require removal of 160,000 pounds of BOD per day. A lagoon of these characteristics, according to conventional practices, might require about 56 is on other part 6 100 HP surface aerators. The corresponding equipment cost could be $1,000,000.00 without installation. Power expense may be assumed at $70.00/HP year. This energy rate is about 1¢per kwh.

According to the concepts of the present invention, a 90 percent reduction in BOD would require recirculation of about 1200 MGD for the same lagoon. The high recirculation is required because of high BOD, about 500 ppm. A 30,000 gpm pump may be utilized since it exhibits minimum first cost per gallon of capacity. The capacity of this pump is about 42 MGD. Twenty-eight such pumps would be required. These pumps would cost about $667,436.

Various pump arrangements may be used. One such arrangement is a series of single pumps located along the lagoon according to the oxygen demand. Each pump satisfies 1/28th the oxygen requirement, 3.6 percent. Eight pumps provide 28.8 percent of the total oxygen requirement. Six pumps provide 21.4 percent of the total oxygen requirement. Three pumps provide 10.7 percent. Two pumps provide 7.14 percent of the total oxygen requirement.

A particular pump group consists of six pumps. Such groups would be located at: 21.4 percent, 42.8 percent, 64.2 percent, and 85.6 percent cumulative oxygen demand locations. These occur at perentage lengths of: 9 percent, 21 percent, 37.3 percent, and 62.3 percent, respectively. What this means is that a six pump group would be located at approximately these percentage length stations: 4, 14, 18 and 48. The remaining four pumps have to cover from 62.3 percent to 100 percent length. These four pumps could be located singly, in pairs or in a group of four. The lagoon length involved is about 3/8th the lagoon total length or detention time. The corresponding detention time is about four days to travel from the 62.3 percent to the 100 percent point.

To assess the spatial arrangement, it is convenient to refer to the plug flow lagoon geometry. The same requirements are used, that is a detention time of about eleven days, a depth of 20 feet and an area to hold 462 million gallons. The required net lagoon area is 3.1 million square feet. For L/W = 10, the widthis 560 feet and the length is 5,600 feet. This mile-long canal would be folded into the enveloping site.

A square lagoon site may be considered. Of the rectangular configurations, the square has the maximum liquid surface area per unit length of berm. The berm has slope of 1 on 3 and a top width of 20 feet. For the 20 feet depth, this berm configuration has an equivalent rectangular section width of 60 feet.

The square site dimensions would correspond to an area of about 4.4 million square feet, roughly 100 acres. The L or W dimension is 2,000 feet. From this, it is clear that the plug flow lagoon length would be folded to make 3 L traverses. Three times 2,100 or 6,300 is close to 5,600. A compensating change in W may be made to 490 or 500 feet. However, this correction would be excessive, as noted below.

At this point, the total berm length and equivalent area are determinate. The length is about 4 L + 1.5 L, or 5.5 L. The equivalent surface area is 60 5.5 L. The corresponding length is 11,550. The equivalent area is 0.7 million square feet.

Thus, the net lagoon area is 4.4−0.7 = 3.7 million square feet, which is consistent with the 3.1 million square feet required. This is so recalling that the berm is trapezoidal in cross section, not rectangular as assumed. The assumed equivalent berm width was 60 feet. The half-width is 30 feet. However, the trapezoidal configuration half-width is 70 feet. This affects the site by reducing the available lagoon area. The amount of the reduction in area is about 4 L 30, or 0.3 million square feet.

Thus, a site area of 4.42 million square feet can accommodate a net plug flow lagoon area of 4.42−1.15 = 3.27 million square feet. The ratio of lagoon to total area is 0.74. Earlier, it was assumed that this ratio was 0.7. At any rate, 3.27 million square feet compares favorably with the 3.1 million square feet required for eleven days detention time. The average nominal detention time would be 11½ days. These preliminary estimates are a guide for actual layout as shown in FIG. 4. Similar calculations were made for a lagoon depth of 15 feet. The results are listed next for comparison.

TABLE V

EFFECT OF DEPTH ON PLUG FLOW LAGOON GEOMETRY

| DEPTH (FEET) | AREA, M Ft.$^2$ NET | AREA, M Ft.$^2$ SITE | SQUARE SITE SIZE | LAGOON SIZE WIDTH | LAGOON SIZE LENGTH |
|---|---|---|---|---|---|
| 20 | 3.27 | 4.42 | 2,100.00 | 560.00 | 5,600.00 |
| 15 | 4.33 | 5.66 | 2,380.00 | 660.00 | 6,600.00 |
| Increase | 1.06 | 1.24 | 280.00 | 100.00 | 1,000.00 |
| Increase % | 32.40 | 28.00 | 13.30 | 17.80 | 17.80 |

In Table V, the effect of a 25 percent reduction in lagoon depth is shown. As might be expected, a lagoon site area increase of about 28 percent occurs and lagoon linear dimensions increase about 18 percent.

It is of interest to note the effect of lagoon flow selected. Particularly significant is the complete-mix single basin compared to the plug flow canal. Recall that the BOD reduction rate is proportional to the BOD remaining. In a complete-mix system, that is in a system where there is no change in oxygen dissolved, BOD remaining, or any other system parameter with a change in location, i.e., there are zero concentration gradients, the effluent BOD must be the system BOD. Thus, the system BOD would be about 10 percent of the influent BOD. The detention time for 90 percent reduction in the complete-mix system must be much longer than for the plug-flow system.

Each system must reduce 160,000 pounds of BOD per day. From Table IV, the average rate of reduction for the plug flow system is 50 percent of the total reduction in the total 11½ day residence time. The same table shows the complete-mix system BOD reduction rate as 2.9 percent of the total reduction in the last 1.15 days. The ratio of these figures is 50/2.9, or 17.24. The required detention time for the complete-mix system is 198 days. Thus, for comparable performance, the complete-mix system exhibits excessive demand for detention time, i.e., lagoon volume and site area.

Now, a deeper lagoon will be examined. In this lagoon, the canal is 560 feet wide and 5,600 feet long.

Previously, pump group locations and area coverage were estimated in terms of lagoon length. The results are summarized in Tables VI A and VI B.

previously in Table VI B. Three cells have single pumps.

The cells of the lagoon may be provided with recirculation distributor mains and eductors to develop circulation. One distributor main configuration is radial. The radial distributors may differ in length as suggested in FIG. 4.

For vertically-directed eductors, a localized induced circulation will develop. It is also possible to incline the eductor, i.e. from the vertical. In this way, a generalized rotational circulation may be induced in each cell. This may be desirable for two reasons.

First, the eductor discharge pattern to the lagoon surface is extended. For example, at 30° inclination, the path length is increased about 15 percent. Conveniently, the second effect is a horizontal component of circulation momentum applied at one half the eductor total momentum. Thus, inclinations of 5° to 10° may be useful, then a rotational circulation in the cell may be induced and sustained.

The eductor inclination need not be a constant. In

TABLE VI A

PUMP GROUP CANAL COVERAGE (FIRST APPROXIMATION)

| GROUP NO. | NO. OF PUMPS USED | LOCATION %L | LOCATION FT. | CANAL REACH % | CANAL LENGTH FT. | WIDTH FT. |
|---|---|---|---|---|---|---|
| 1 | 6 | 4 | 224 | 0–9 | 504 | 560 |
| 2 | 6 | 14 | 784 | 9–21 | 672 | 560 |
| 3 | 6 | 28 | 1,568 | 21–37.3 | 913 | 560 |
| 4 | 6 | 48 | 2,688 | 37.3–62.3 | 1,680 | 560 |
| 5 | 4 | | | 62.3–100 | 2,111 | 560 |

TABLE VI B

PUMP GROUP CANAL COVERAGE (IMPROVED DISTRIBUTION)

| GROUP NO. | NO. OF PUMPS USED | LOCATION %L | LOCATION Ft. | CANAL REACH % | CANAL LENGTH % | WIDTH Ft. |
|---|---|---|---|---|---|---|
| 1 | 8 | 6 | 336 | 0–12.7 | 711 | 560 |
| 2 | 6 | 20 | 1,120 | 12.7–26.5 | 772 | 560 |
| 3 | 4 | 32 | 1,792 | 26.5–37.7 | 627 | 560 |
| 4 | 3 | 43 | 2,408 | 37.7–49.0 | 633 | 560 |
| 5 | 2 | 54 | 3,024 | 49.0–58.5 | 532 | 560 |
| 6 | 2 | 64 | 3,584 | 58.5–70.5 | 672 | 560 |
| 7 | 1 | 74 | 4,144 | 70.5–79.5 | 504 | 560 |
| 8 | 1 | 85 | 4,760 | 79.5–91.5 | 672 | 560 |
| 9 | 1 | 95 | 5,320 | 91.5–100 | 476 | 560 |

Referring to Table VI A, it is apparent that the canal section coverage of groups 1 through 3 is approximately square. This is so because the canal width at the liquid surface is about 620 feet. Group 4 coverage must extend through a substantial reach of the canal, 1,680 feet. Group 5 must cover a still greater reach. It is believed that redistribution of pump groups 4 and 5 would be desirable. This is shown in Table VI B.

This table shows that pump groups having from 8 to 1 pumps are useful. An eight-pump group is generally useful at the lagoon entrance. The tabular indication is that pump groups may be located in multiples on piers. Piers should accommodate from one to eight pumps, air compressors, lifting gear and starter-controller groups.

The folded channel configuration discussed is shown in FIG. 4. In this figure, dimensions and arrangement of equipment are for the 42 MGD lagoon, 20 feet deep.

FIG. 4 shows that the lagoon contains 9 cells. The cells are rectangular, almost square. Six cells have multiple pump installations. The number of pumps per cell ranges from 8 to 2. The pump complement is as shown fact, for an induced cylindrical vortex with a vertical axis, the amount of inclination should be proportional to the cell radius to the eductor. This would develop a cell circulation with minimized momentum loss.

Considering the cell-cell interaction, another fact emerges. It would be undesirable to develop interacting vortex circulations. This would cause excessive momentum losses. In consequence, the rotating cylindrical vortex circulation would be attenuated in intensity. This may be avoided by having adjacent cells rotate in an opposing sense. Then the interaction is minimized because the interface between cells is one between vortices of comparable strength having essentially equal peripheral velocities. The vortex velocities have the same magnitude and direction at the cell interface. This is preferable to having vectors of equal magnitude acting in opposing directions. This preferred situation is suggested in FIG. 4. There the imposed vortex sense suppresses intercellular momentum exchange.

Considering intracellular mixing, it is apparent that the present aerator system imposes a high degree of momentum exchange and mixing within each cell. Between succeeding cells, little mixing occurs. With this arrangement, the "plug flow" concept is thus modified. In effect, each cell becomes a "complete-mix" unit. Successive cells operate as "complete-mix" units. Each succeeding cell operates on a reduced level of BOD. Still, the amount of BOD reduction is approximately exponential as initially suggested in FIG. 7. However, the series of cells shown in FIG. 2 operates as nine separate, cascaded, "complete-mix" units. Their operation approximates the smooth exponential decay of FIG. 1 with a series of nine steps.

Thus, this extended, cascaded cell series is markedly superior to an entire complete-mix batch operaton. The batch would be typical of a lagoon without either baffles or an extended channel. The batch lagoon type develops a comparatively reduced rate of BOD reduction and requires excessive area. Further, as an approximation, the continuous exponential decay in BOD is an appropriate analytical technique for the suggested lagoon configuration.

Once the lagoon configuration has been determined in accordance with the above guide lines, it remains to indicate suggested pump arrangements. One possibility is a polygonal pier having vertical column or pile support and an overhung cantilevered horizontal platform. The pier bottom foundation should be continuous within the columns or piles and should extend beyond them. The extended continuous base 45 has two purposes. First, it reduces foundation loads. Secondly, it minimizes botton scour at the pump suction.

There is a third purpose for the local pad beneath and extending radially beyond the pier. In the event that this foundation is at the same elevation as the lagoon, both the diffusers and pump impeller would be elevated above the bottom plane.

On occasion, it may be desirable to locate the eductor-diffuser subassembly at the lagoon bottom. The distributor would be buried beneath the bottom surface and hence would minimize the particle settling and buildup in the vicinity of the distributors. In this case, the total head on the pump impeller would be increased. Not only can this be corrected, but broader benefits may be derived.

Figure 11:
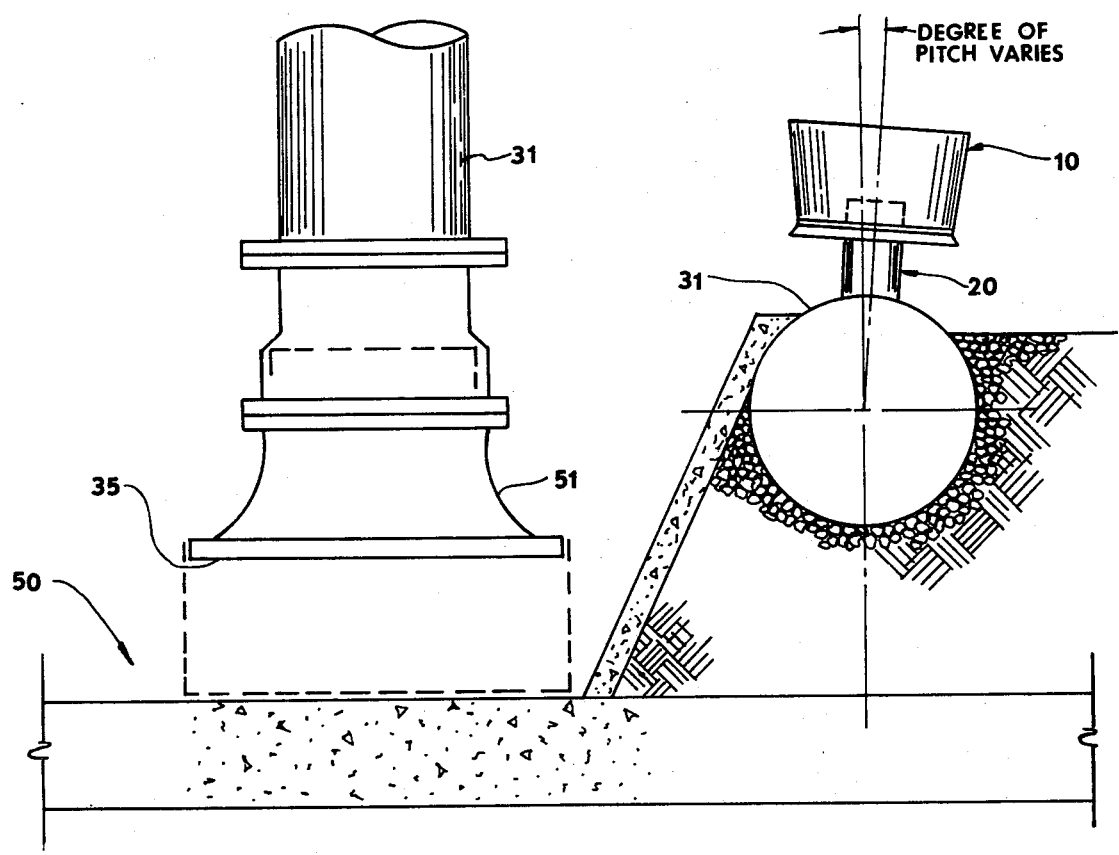
FIG. 11 is a cross sectional view of an eductor having a shallow wet well with the pump impeller located therein.

If the foundation surface below the pier is depressed to form a shallow wet well 50, the pump impeller 51 may be lowered. This is shown in FIG. 11 where the impeller is located 2 feet below the diffuser. In this illustration, the distributor is positioned below the lagoon bottom. This arrangement reduces pump head by two feet. Since the usual system design is for a total pressure drop of four feet, the total pressure drop is halved. In the usual design, the head loss is a 2-foot velocity head loss at the diffuser and pump columns, as well as losses from the elbows and the distribution piping. Therefore, slight lowering of the pump impeller in a shallow wet well can materially reduce energy requirements of the aeration system.

The polygonal pier spacing must be greater than the overall pump suction-discharge dimension. In this way, the propeller pump may be secured readily without interference. The propeller pump influent bell-mouth will normally be the controlling dimension on the radial location of the pump suction. Fixing this dimension, the cantilever dimensions are readily determined from the pump base details.

The pier height must suffice to clear the liquid surface or a below-deck pump discharge elbow should this be selected. The minimum water level depends upon the allowable pump suction head. This suction head is also limiting for equalizaton basins. The pier deck should provide space for lifting gears, pumps, air compressors, starters, contactors, dissolved oxygen and turbidity instrumentation and controls. The deck design must enable pump placement and removal. It should be possible to reach the deck from a boat, barge or dredge at any water level anticipated for the basin.

One desirable pier configuration is octagonal to accommodate one to eight pumps. A similar hexagonal pier would have a one to six pump capacity. For a single pump support to a four pump support, a square pier may be useful.

Considering the cost of the system, the particular example of Table VI A, system cost is increased by the three cells with one pump. A preliminary cost analysis has been run to assess system cost with one central pier, as at 85 percent L or 4,760 feet. It would accommodate three pumps. One each would handle the preceeding, instant and following cells.

In this case, the expense of two piers is traded off against the expense of two principal distribution mains. One main would be 4760−4144 = 616 feet long. The other main would be 5230−4760 = 470 feet long. These lengths are based on data from Table VI B.

Each main would handle 30,000 gpm. Use of a 36-inch diameter concrete pipe is desired. In these mains, the pressure drop would be 6 feet and 5 feet, respectively. This is acceptable since these mains do not involve eductors. The pump operating cost would be about doubled for 2 of 28 pumps. Thus, this cost analysis is a comparison of costs for 2 piers against the cost of doubling operating cost for two pumps. Equivalent capital cost could be based on the annual cost of extra energy, interest at 8 percent and a 2 year term. This is somewhat less than twice the annual increased cost of energy.

The cost of two piers was estimated at $50,000.00. The cost of 1100 feet (i.e, approximately 1,086 feet) of a 36-inch pipe is estimated at $170,000. Since the pipe system doubles energy for two pumps, and substantially increases capital cost, it is impractical on the basis of comparisons of overall cost.

The resulting configuration would have been a seven pier, nine cell lagoon. This is not preferable to a 9 pier lagoon as shown in FIG. 5. The same figure illustrates some eductor details on inclination and on the rotational vortex circulation between adjacent lagoon cells.

The eductor complement for the foregoing arrangement may be estimated. Results appear in Table VII.

TABLE VII
EDUCTOR CHARACTERISTICS[1]

| DIAMETER | | PUMPED FLOW |
|---|---|---|
| DIFFUSER, IN | SKIRT, IN | MGD |
| 2 | 6 | .16 |
| 2½ [2] | 8 | .24 |
| 3 [2] | 9 [2] | .36 |
| 4 | 12 | 0.63 |
| 5 [2] | 15 | 1.0 |
| 6 | 18 | 1.5 |
| 8 | 24 | 2.6 |
| 10 | 30 | 4.0 |
| 12 | 36 | 5.7 |

[1] Based on a nominal velocity head of 2 feet and a corresponding nominal velocity of 11.3 feet. sec.$^{-1}$
[2] Non-standard sizes The preceeding discussion has centered on the plug flow lagoon. In either a plug flow or a complete-mix lagoon, the basic circulations around each cell are comparable. There are four such circulations and these are considered next in the context of a complete-mix lagoon.

COMPLETE-MIX LAGOON

The first aspect considered is rotational flow and the momentum of such a system. It has previously been shown that the present aeration system provides controllable means for imposing horizontal and vertical momentum on a cell. The ratio of the horizontal to the vertical components is the tangent of the inclination. For small angles, the tangent about equals the angle, in radians. This means that:

$$\phi = m_h/m_v$$

Where
$\phi$ is the inclination angle in radians;
$m_h$ is the horizontal component of momentum; and
$m_v$ is the vertical component of momentum.

Previously, it has been noted that the magnitude of momentum is established by the velocity head at the diffuser discharge. This is fixed by the pump discharge and by the size and number of eductors assigned to each pump. A preliminary design value is 2-feet, for velocity head.

The components of velocity head are set by rotating the distributor pipe section in which the eductor is set. In this way, at any cell radius from the pump discharge column, a prescribed $\phi$ may be set. This is the technique for establishing any desired functional relation of $\phi$ as a function of r, usually written $\phi(r)$.

The function requires consideration. The reason is the obvious one that energy dissipation in the cell circulation is very sensitive to $\phi(r)$. In particular, $\phi(r)$ should be continuous and should show no sharp discontinuities. At any boundary, the magnitude of $m_h$ should be low, unless the boundary is itself moving at a velocity consistent with the value $m_h$.

To illustrate circulations which may be compared to the conditions set forth, some examples may be considered. One is a circular, vertical cylindrical container with fluid. If this is set centrally on a turntable and is then rotated, a simple circulation will develop. Initially, the circulation is zero, the velocities in the fluid are zero and the cylindrical wall starts rotating. Owing to fluid viscosity, the fluid at the wall is subjected to shear. Momentum exchange begins, dissipating energy. If the rotation continues, at constant speed, finally the fluid will develop a tangential velocity at each radius. This functional $V_t(r)$ will be linear. The horizontal velocity of the center elements on the axis of rotation is zero. At the cylindrical wall, the fluid velocity will be almost equal to the wall velocity.

At the wall, there will be a local difference in velocity since the wall is driving the fluid. The velocity profile there may be referred to as a boundary layer. Such boundary layers also develop in pipe flow when a fluid passes through a pipe line.

In every case, boundary layers dissipate energy. In the rotating cylinder on the turntable, if power is removed, the turntable will slow down and its rotation will stop. As this happens, the rotating fluid will continue to rotate and will tend to drive the cylindrical wall. The boundary layer will change at the wall. Energy dissipation will begin to increase. Momentum exchange will increase at the wall-fluid interface. This mixing zone will propagate radially inward. Thus, there is little mixng in the idealized rotating cylinder. Mixing only develops when the linear function $V_t(r)$ is made non-linear locally.

There are practical examples of a rotating fluid cylinder substantially free of mixing. This configuration is typical of a clarifier of a waste or sewage treatment plant wherein the clarifier has a rotating bottom rake. At the bottom and at the wall, there is a slight degree of mixing. In the main body of the fluid, essentially no mixing occurs. There, sedimentation proceeds satisfactorily.

The desired condition is not ideal for a lagoon cell. In such a cell, we want particle entrainment and mixing. Thus, we do not want a linear $V_t(r)$. The desired modified $V_t(r)$ can be obtained by local, rather than distributed momentum input. The input should be from separated jets, as from the diffusers. However, at circulation cell boundaries, it is desirable to have common velocities, or at fixed boundaries, low circulation velocities.

In qualitative terms, these conditions may be satisfied using a relatively small number of eductors. Horizontal components of momentum should be set to achieve an acceptable $m_h(r)$. The $m_h(r)$ may begin at zero levels at the pump discharge. The $m_h(r)$ may increase linearly, at least to some intermediate radius.

However, near the boundary of the circulation, the $m_h$ must be adjusted to minimize energy dissipation. Thus, several conditions arise. If the circulation boundary is contiguous with a second circulation boundary at the extreme radius, $m_h$ should be of equal magnitude and direction. (If $m_h$ is not equal in magnitude and direction, the interfacial region should not be small.) In another case, at the extreme radius of the cell circulation, a buffer region may exsit between the circulation and the fixed surface. Then, the circulation at the extreme radius may have non-zero momentum. In the case for a small buffer region, if the boundary is fixed, $m_h$ should be near zero at the extreme radius.

Any induced circulation in a lagoon cell will be energy dissipative at its boundary. This is so unless the boundary interface exhibits equal magnitude and direction of momentum. For initially static buffer regions, a matching subcirculation will be induced. It will exhibit momentum exchange, i.e. mixing, at the expense of energy dissipation.

The foregoing discussion has focused on one of four circulations. This is the rotational circulation. It is the greatest overall circulation induced in a lagoon cell. As noted, it consists primarily of horizontal components, momentum and velocity. These vary in magnitude radially. Rotation is essentially in a horizontal plane about a vertical axis centered in the cell. Thus, the directional components are tangential and axial in a cylindrical coordinate system.

Radial flow and the momentum thereof will now be considered. The uses of discharge flow in diffuser jets mounted in eductors, as noted, involves tangential flows. The concept of central piers accomodating recirculating pumps involves suction flow.

The pump suction flow induces a radially inward flow at the central pier. The flow is predominantly at the lagoon bottom. At any cell radius, the cell surface is cylindrical. Near the bottom of the cylinder, inward flow equates to pump flow. In the upper section of the cylinder, through this cylinder, a compensating equal flow develops. It is directed radially and outward. In the lagoon cell, these flows develop a toroidal, or doughnut-shaped vortex.

In the toroidal vortex, predominant flow momentum and velocity components are radial and axial, i.e. vertical. Tangential components are minimal. Velocity magnitudes have been previously discussed.

In summary, it should be noted that the diffuser jets have principal components of momentum, directed vertically with horizontal components proportional to their inclination. These local jets interact with the induced toroidal flow. It is clear that they promote bottom-to-top mixing. The more intense region of this circulation is the cell central section.

In contrast, the rotational circulation is more intense away from the central cell region. The rotational circulation may be set to extend its mixing influence outside the cell boundary. This is fixed by the $m_h(r)$ magnitude at extreme values of $r$.

The third principal circulation imposed upon a lagoon cell is induced by the diffuser jets. This can be visualized utilizing a cylindrical tank containing fluid such as a small aerobic digester. If a diffuser-eductor is set centrally on the bottom and diffuser flow is begun, it is apparent that the eductor will induce bottom flow radially inward. The eductor discharge will yield a direct and an induced local vertically upward flow. The suction and discharge flow from the eductor will induce a localized toroidal circulation. This circulation will extend radially outward from the diffuser jet.

Figure 6:
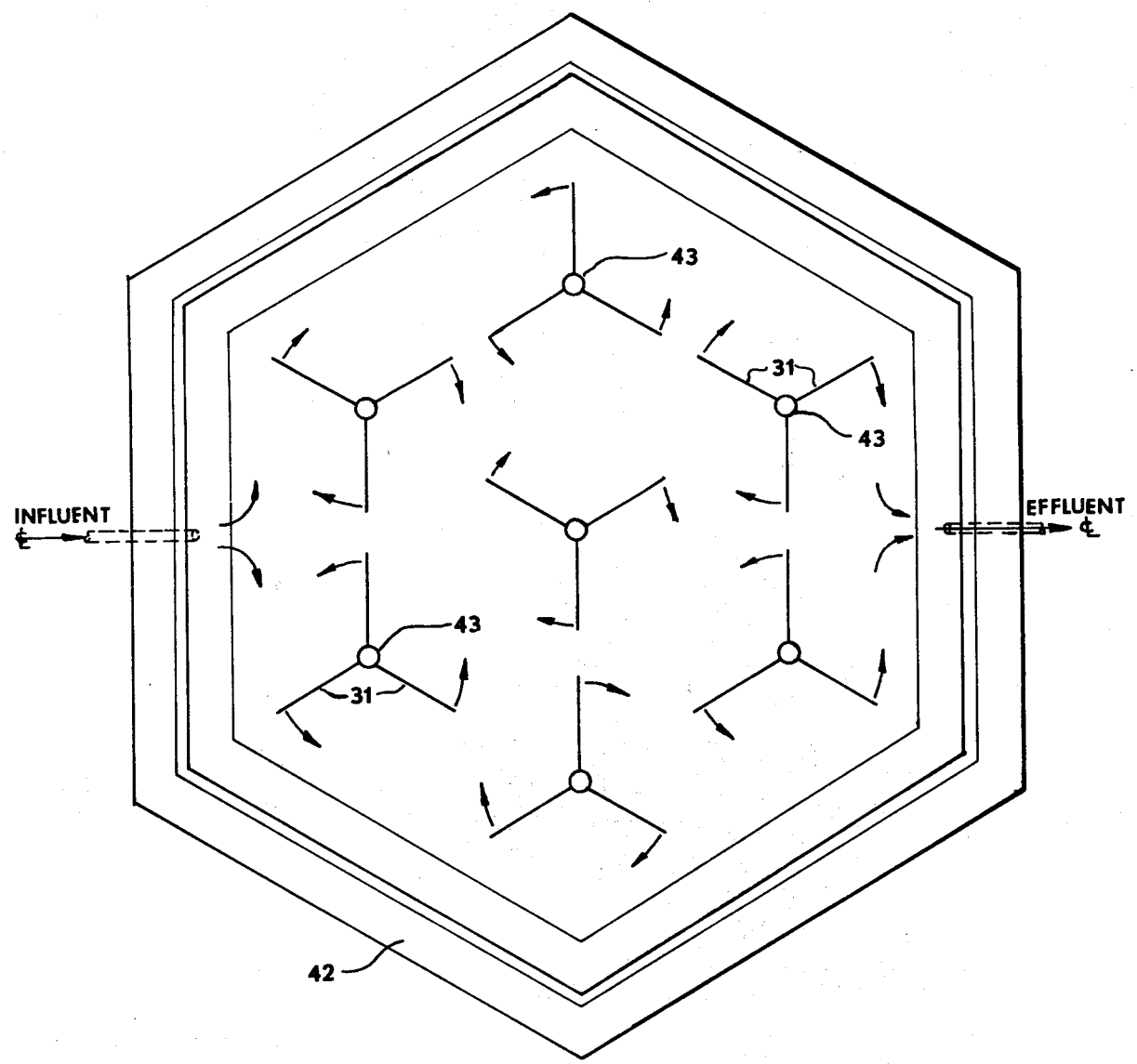
FIG. 6 is a plan view of another layout utilizing apparatus according to the present invention for treating waste.

However, in the complete-mix lagoon shown in FIG. 6, the actual disposition of eductors is radial, along a distributor which accepts pump discharge flow. The radial extent of the local toroidal circulation is half the eductor spacing on the distributor. Each eductor will induce this local circulation. It is superimposed upon the local components of the rotational and radial circulations.

The interfacial circulation between cells and contiguous cells or external boundaries is the fourth circulation developed in lagoons. Both intercellular and extracellular interfaces in circulation must be considered. Where the interfacial separation is minimal, the local effect on circulation is small if the momentum vectors are of equal magnitude and direction.

With such vectors, the effect of separating the cells to increase the interfacial distance is of interst. In this case, the interfacial region will develop an induced circulation. It will develop in magnitude and direction in such a way as to minimize energy dissipation. Since mixing depends upon momentum exchange and on energy dissipation, excessive separation of cell interfaces is undesirable.

Where the cell interface occurs between cell circulation and an external boundary, similar conditions prevail. As before, minimum separation is desirable. However, for lagoon cells the situation which typifies this case is the cell-berm interface. In the vicinity of a berm, the momentum and velocity which should be imposed is reduced. A primary consideration is erosion, unless the structure is lined, paved, concrete or metallic. This constraint inevitably leads to some compromise in mixing in close proximity to berms.

The compromise suggested involves the rotational circulation. It is normally the circulation exhibiting the highest potential intensity of the cell-berm interface. The compromise is in the $m_h(r)$ at extreme values of $r$. One technique is to restrict its maximum.

For example, to some intermediate $r$, $m_h(r)$ may be linear. If $r_i$ is expressed as a fraction of the maximum radius, some $r_m$ trends may be noted.

At $r_i/r_m$ equal $\frac{1}{2}$, the linear relation extends throughout 25 percent of the cell volume. For $r_i/r_m$ of $\frac{3}{4}$, the linear region includes a little more than half the cell volume. Next, the question is how should $m_h(r)$ vary from $r_i$ equal $\frac{3}{4}$ $r_m$ to $r_i$ equal $r_m$. Previously, we have seen that the value $m_h$ at $r_m$ should be low. It may be zero. However, to reduce it to zero may excessively reduce mixing in the region near the berm.

In a lagoon of 25 feet depth, this region extends 75 feet for the usual berm slope of 1:3. Since $m_h$ is induced by a bottom jet at $r_m$, it appears that at maximum radius, a reasonable $m_h$ might be in the range from equal to $m_h$ at $r_i/r_m = 0.75$ to equal to $m_h$ at $r_i/r_m - 0.50$.

One possibility is to use a reduced linear function $m_i(r)$ extended to $r_m$. Then, there would be no dicontinuity in $m_h(r)$ within the cell, except for the jets from the diffusers used to induce $m_h(r)$. It has been pointed out that these local effects are desirable in developing mixing. In this case, the mixing in the cell-berm interface would be emphasized. The reason for this is the sharp discontinuity in the forced $m_h$ at $r_m$ and that induced in the cell-berm interface.

However, within the range of $m_h$ listed, other possibilities exist. Other cases would imply that the function $m_h(r)$ would either, a. vary linearly to $r_i/r_m = 0.75$, then remain constant;
b. vary linearly to $r_i/r_m = 0.75$, then decrease linearly at the same rate; or
c. vary linearly to $m_h$ at $r_m$.

The final decision only involves setting the distributor pipe to the desired jet inclination from the vertical. This decision may be made at any time, until the distributor piping is emplaced. The fact remains that cell interfacial separation is an important design variable. Since this is established by cell arrangement within a lagoon and by the lagoon envelope, these factors deserve further consideration.

CELL ARRANGEMENT

The basic cell shape is circular. It may be considered as square or rectangular for a pier accomodating four pumps. For a two, three or six-pump pier, the cell envelope is circular or hexagonal. An eight-pump pier exhibits an octagonally-shaped cell envelope.

Of these cell envelopes, the hexagonal cell can be close packed. It approximates a circular envelope. However, considering the interface between cells, a hexagonal envelope is superior to a circular envelope. The differences involve the local separation of contiguous circles compared to hexagons. This distinction almost vanishes for an actual rotational circulation in a cell. However, it does point to the desirability of arranged distributors in adjacent cells. The arrangement which seems desirable is colinear distributors. Thus, distributors should be directed to the half point of each contiguous hexagonal side.

Practical cell groups for hexagonal cells are: one, three, seven, and nineteen. For these groups, the enveloping boundary would be circular or alternatively, hexagonal in the case of seven cells. These envelopes represent minimum volume containers. The circular container is practical for concrete or steel, not for earthen dikes.

It is believed that the hexagonal dike is practical for large earthen-diked lagoons. However, the seven-pier hexagonal group may be surrounded by a rectangular dike having side length ratios of 1:1.148, is preferred, for earthen construction. The overall length ratio for the rectangular compared to the hexagonal dike is 1.26. In the case of a rectangular envelope, the cell-dike separation is increased. This degrades mixing. Otherwise, the seven-cell configuration is nearly ideal for a complete-mix lagoon in which particle entrainment is an important design consideration.

The suggested complete-mix lagoon arrangement of seven cells is shown in FIG. 6. There, it is apparent that the intercell and cell-dike interfacial regions are minimal in volume. This facilitates the best possible approach to idealized mixing.

Note that for locations in the Northern hemisphere, the peripheral cells rotate alternatively clockwise and counterclockwise. The central cell should rotate counterclockwise. The clockwise cell rotation will be unstable. Instability would only be apparent as pumps shut down.

As shown in FIG. 6, and specifically in the reduced cell-dike interfacial volume, the external momentum components will induce local circulation in the interfacial region. The intensity of this circulation is proportional to the external velocity and inversely proportional to the interfacial volume. It has been noted previously that the circulation induced will tend toward one of minimum energy dissipation. Also suggested is the increased separation of the central distributors. This is a response to opposed $m_h$ directions between the central cell and three of the six surrounding cells. The cell arrangement shown appears most likely to meet specific requirements such as that all solids will remain in suspension and that there will be no sludge deposits in the lagoon.

A discussion of fluid momentum in aerobic units will now be set forth, followed by a working example of a complete-mix lagoon.

COMPARISON OF FLUID MOMENTUM IN AEROBIC UNITS

This comparison of fluid momentum refers to aerobic unit internal circulation. Such circulation is related to suppressing gradients in: BOD, DO and MLSS. It is, therefore, related to floc or sludge separation from the fluid mass in aerobic units. Circulation is induced by momentum transferred directly or induced within the fluid mass. It is momentum transfer which defines a zone of influence. Techniques will be noted for aeration which ensure momentum transfer to tank fluid in predictable magnitudes. The applicable techniques for extending the zone of influence are also set forth.

It is necessary to distinquish momentum actually transferred to the tank fluid from that merely imposed upon the fluid. The principle of momentum conversation states (CHEMICAL ENGINEER'S HANDBOOK, Perry, J. H., McGraw-Hill Book Company, New York) that the total momentum within a system remains constant during the exchange of momentum between two or more masses of the system. Through this exchange or transfer of momentum, there is a loss in kinetic energy. The equation of momentum is:

$$F = (W \Delta V/g_c) = \rho q (\Delta V/g_c)$$

Where $F$ is the force acting on the fluid, pounds;
$W$ is the weight rate of flow, pounds per second;
$\Delta V$ is the change in velocity, feet per second, a directional (Vector) quantity;
$\rho$ is the fluid density, pounds per cubic feet;
$q$ is the volumetric flow rate, cubic feet per second; and
$g_c$ is a dimensional constant, 32.17 pounds feet, (per pounds force second squared).

In a two-component momentum transfer system, two masses may be considered, $m_M$ and $m_N$. For tank aeration, it is convenient to consider first total velocity. Then, the momentum relation is:

$$\frac{[(m_M - V_M)/g_c] + [(m_N - V_N)/g_c] = [(m_M + m_N)/g_c]}{V}$$

Where $m_M$ is the mass of one component, the air supply;
$V_M$ is the vertical velocity of the air supply;
$m_N$ is the mass of the tank liquid component at the distributor,
$V_N$ is the vertical velocity of the tank liquid at the diffuser; and
$V$ is the vertical velocity of the air-fluid system after the exchange of momentum.

For conventional aeration with submerged diffusers, it is not unusual to supply about one thousand cubic feet of air per pound of BOD. This is done to satisfy requirements for mixing and for about 240 pounds per million pounds of waste. From these figures, the air supplied for aeration is 0.018 pounds per pound of fluid. Thus, the foregoing expression may be simplified by:

a. multiplying each term by $g_c$;
b. dividing each term by $m_N$, the mass of tank fluid; and
c. substituting for $m_M/m_N$ the value of 0.018.

The result is:

$$V_N + 0.018 \, V_M = 1.018 \, V$$

Where $V_N$ is low, about 1 foot per second;
$V_M$ is limited by a restricted pressure drop at the diffuser to values less than 20 feet per second; and
$V$ is the tank air-fluid velocity.

In a two component momentum transfer system, two masses may be considered, $m_M$ and $m_N$. For tank aeration, it is convenient to consider first total velocity. Then, the momentum relation is:

$$\frac{[(m_M - V_M)/g_c] + [(m_N - V_N)/g_c] = [(m_M + m_N)/g_c]}{V}$$

Where $m_M$ is the mass of one component, the air supply;
$V_M$ is the vertical velocity of the air supply;
$m_N$ is the mass of the tank liquid component at the distributor,
$V_N$ is the vertical velocity of the tank liquid at the diffuser; and
$V$ is the vertical velocity of the air-fluid system after the exchange of momentum.

For conventional aeration with submerged diffusers, it is not unusual to supply about one thousand cubic feet of air per pound of BOD. This is done to satisfy requirements for mixing and for DO. A typical BOD concentration for residential waste would be about 240 pounds per million pounds of waste. From these figures, the air supplied for aeration is 0.018 pounds per pound of fluid. Thus, the foregoing expression may be simplified by:
 a. multiplying each term by $g_c$;
 b. dividing each term by $m_N$, the mass of tank fluid; and
 c. substituting for $m_M/m_N$ the value of 0.018.

The result is:

$$V_N + 0.018\, V_M = 1.018\, V$$

Where $V_N$ is low, about 1 foot per second; $V_M$ is limited by a restricted pressure drop at the diffuser to values less than 20 feet per second; and $V$ is the tank air-fluid velocity.

Substituting, the value of V is found to be 1.34 feet per second with conventional aeration using submerged diffusers. The tank air-fluid system velocity V is a measure of momentum transferred.

With aeration, according to the present invention, much lower values are used for air supply. A typical value is less than ten pounds, or 134 cubic feet per pound of BOD. This provides two pounds of oxygen per pound of BOD. Then, the ratio of $m_N/m_N$ is 0.0024. This is equivalent to 13 percent of the air supply to conventional diffusers.

In the aeration of the present invention, pumped recirculation is generally used. The recirculation is discharged at the diffuser components of eductors, preferably at 11.3 feet per second. The recirculation mass may be referred to the mass of tank fluid. For example, for a depth of 20-feet, the pumped recirculation is 16 times the influent flow rate for the same ppm BOD reduction, 240.

The detention time in the aerobic unit might be 6 hours or ¼ a day. The corresponding tank volume is ¼ the influent volume per day. In the 6 hour period, the recirculated volume is 4 times the tank volume. In this system, the fluid and air velocities are equal at the diffuser tip. Substituting as before, we find:

$$0.0024\, V_M + V_N = 1.0024\, V$$

Where $V_M$ equals $V_N$ at 11.3 feet per second. From inspection, $V$ is essentially 11.3 feet per second. As before, $V$ is a measure of momentum transferred to the tank mass. For the present invention, $V$ is preferably 11.3, for conventional aeration, $V$ is 1.3.

Thus, as far as momentum is concerned, the ratio of the present invention to conventional momentum input transferred to the tank fluid is 11.3/1.3, or 8.7. This figure represents the ratio of momentum imposed on the system with no momentum losses. The momentum relations described may be expressed in terms of energy supplied per unit volume of waste treated. Recalling that the present invention's preferred recirculation figure is 16 times the influent flow rate, supplementary tabular data shows that the corresponding energy input is 350 kwh per million gallons, or 470 horse power hours per million gallons. This assumes 240 ppm BOD removal in the aerobic unit and a requirement of 1.4 pounds of oxygen per pound of BOD removed. If these energy figures were expressed in terms of aeration basin volume, the figures would remain unchanged for a detention time of one day. They increase four times for a detention time of 6 hours. They decrease to one-tenth the stated values for a detention time of ten days. For this latter case, the values are 35 kwh per million gallons of aerobic unit volume, or 47 kwh per million gallons of aerobic unit volume.

It is important to consider momentum actually transferred rather than momentum or energy imposed on the system. The prime reason for this is the efficiency of momentum transfer in a system comprised of fluid pumps and submerged fluid eductors is greater than the efficiency of momentum transfer from compressed air discharged through submerged diffusers. Unless submerged air diffusers transfer momentum 9 times more efficiently than the fluid pump-eductor system, the present invention achieves higher momentum input to the tank volume than submerged diffusers.

The momentum data discussed was for total values. For submerged diffusers, the total useful momentum exchange occurs vertically. However, in the present invention system, the momentum may be separated into two components. One is directed vertically. The other component may be directed horizontally. This component separation is accomplished by slight inclination of the eductor from the vertical.

The readily available horizontal component of momentum may be used to develop a secondary circulation. Recall that eductors are mounted on distribution mains disposed radially about the pier in each cell. In the distributor, eductors are located at various radii from the pier.

The eductor may be inclined from the vertical tangentially at each radial station. If all eductor inclinations were the same, it is apparent that considerable momentum dissipation would occur near the pier. This is apparent from the sharp tangential velocity discontinuity which would develop.

To avoid this tangential velocity discontinuity at each radial station, the eductor inclination may be made proportional to the radius. More precisely, the educator inclinations would be proportioned such that the induced circulation would develop velocity proportional to radius. This avoids the excessive central momentum losses. However, at the cell radial extremity, high tangential velocities would develop. At the extreme radial cell boundary, the velocities should approach small values to minimize energy dissipation between adjacent cells and at the cell-berm interface.

There are two approaches to the problem of controlling tangential velocity at extreme radial locations. One might attempt to impose a specific tangential velocity function of radius from zero to the maximum radius. There is no way to do this without inducing high momentum losses at extreme radial locations, thus an alternative seems preferable, that is, using tangential components of eductor momentum proportional to the radius to the 0.8 radius. This region includes approximately half the volume of a cell of square plan view. Beyond this radius, the cell vortex would not be driven by eductor momentum. Thus, in this peripheral region, momentum would dissipate inducing corresponding fluid velocities and mixing.

Next, the desirable magnitude of the cell vortex velocity at the 0.8 radius can be considered. It seems reasonable to assume a tangential velocity at this point of 1 foot per second. The total velocity determined was 11.3 feet per second. For a tangential component of 1 feet per second, the inclination should be 5.07°. The vertical velocity component would then be 11.26 feet per second. For small angles, such as 5.07°, expressing the angle in radians, the angle is nearly equal to its sine or tangent. Therefore, the inclination at the 0.8 cell radius would be 0.089 radians. At reduced radii, the inclination would be proportionately lower.

As noted previously, the horizontal eductor velocity components are discussed as synonymous with the induced vortex tangential velocity. Actually, the eductor component velocity must be higher. This is necessary to develop the necessary vortex velocities. The increase in tangential component is achieved by increasing the inclination of the eductor from the vertical in the desired tangential direction. The increase required depends upon the size and spacing of eductors. In the example discussed, it may be necessary to double the inclination at any point.

Higher velocity values than 1 foot per second would increase peripheral momentum losses. Lower velocities reduce the sphere of influence of the aeration system. The sphere of influence may be defined as the region in which fluid velocities equal or exceed 0.5 feet per second, regardless of velocity direction.

For the described relation between tangential velocity and radius, the velocity imposed is 0.5 feet per second at the 0.4 radial location. Within this region of the cell, is included ⅔ the entire square cell volume. However, it is within this region that the radially inward component of fluid flow to pump suction points is greatest. For example, at this boundary for each pump emplaced, the average radial component of flow is 0.033 feet per second. Thus, the eight pump pier would have an average radially inward component of velocity of 0.25 feet per second. The tangential component of velocity is 0.5 feet per second. The vector sum of these components is 0.56 feet per second. At half this radius, the average radial component increases to 0.5 feet per second. The tangential component decreases to 0.25 feet per second. The vector sum velocity remains 0.56 feet per second.

For piers having less than eight pumps, proportionately lower average radial components of velocity would be induced. It should be noted that the lagoon cell bottom currents are higher than average. This is so because the pump suction bell is located on the pier close to the lagoon bottom.

Thus, the induced rotational vortex suggested can develop an extended sphere of influence based on gross fluid circulation alone. This is augmented by local velocities induced by each eductor. It is apparent that the sphere of influence extends approximately to the 0.9 radius of the cell. This radius includes ⅘ of the total cell volume.

It is expected that these characteristics may be developed using fewer pumps on the pier. Perhaps the technique would apply to a two-pump cell. For a single-pump cell, a dualized distributor could yield an equivalent vertical cylindrical rotational vortex. Such vortex rotation is induced typically in circular clarifiers. There, the circulation is driven by bottom rakes.

It should also be noted that bottom center removal of fluid in a tank automatically induces rotational vortex flow. This case is analogous to the pumped circulation under consideration. In these cases, the sense or direction of vortex circulation is dictated by earth rotation. Thus, in the Northern hemisphere, the induced vortex circulation is counterclockwise. Thus, the pumped eductor cell circulation may be directed counterclockwise or alternatively adjacent cells may be driven in a reversed sense. The choice depends upon the higher momentum dissipation, intercell or intracell at the periphery.

An example of the complete-mix lagoon is shown in FIG. 6. This particular lagoon is approximately 2,360 feet square and contains 7 cells. As with the plug flow lagoon, each cell contains a pier as shown in FIGS. 2 and 3 which can support any number of pumps such as 4, 6, or 8. The intake of the pump suction, i.e., the pump impeller is generally at or below the diffuser tips of the eductors. Advantages of an impeller location below the diffuser tips derive primarily from the reduction in pumped system head and the corresponding reduction in pumping energy required. The arrows show a suggested rotation within each cell. This circulation is to be imparted to the liquid as achieved by inclining the eductors with regard to the vertical as shown in FIG. 5. FIG. 6 represents a further exemplification of the utilization of the apparatus and method of the specific invention on a large scale. The specific system relates to a waste water or paper mill effluent treatment basin wherein the influent enters from the left with the effluent exiting from the right.

The utilization of a complete-mix lagoon as shown in FIG. 6 will now be discussed.

Assuming a lagoon temperature of approximately 95°, approximately 2 pounds of oxygen will be required per pound of BOD reduced. In this case, 96,000 pounds of oxygen is required per day. An equivalent amount of air is therefore 450,000 pounds per day if all oxygen in the air supplied is dissolved. It is desirable to feed the air in at a rate of 3.4 times the saturation limit for the waste which is 6.2 parts per million of oxygen at a temperature of 95° F. Utilizing a dissolved oxygen content of 90 percent of saturation, a waste water recirculation rate of converted to gallons is 1,184 $MGD_R$. Assuming that each of the 7 piers has 6 pumps each, a flow of 28.2 MGD is required for each pump. Upon calculation, this reveals a flow of liquid of about 20,000 gallons per minute for each pump on each of the 7 piers. Thus, on each pier, two 1205 cubic feet per minute air compressors would meet this capacity and provision on each pier, three such compressors would give a stand-by capacity of 50 percent. A 36-inch diameter Johnson propeller pump has the required capacity when operated at slightly reduced speed and commensurately reduced power. Assuming a pumped system head of 2 feet and a density of water, the power requirement is 13.5 horsepower (HP). Thus, the power for operating the lagoon will be 7 piers with 6 pumps = 42 times 13.5 or about 567 HP. For 7 piers with 2 compressors at 36 HP each, 504 HP is required for air compression. This is a total of 1,071 HP for system aeration. Since the oxygen rate as determined above is approximately 96,000 pounds per day or approximately 4,000 pounds per hour, this yields a figure for pounds of oxygen per HP hour of approximately 3.73. This figure is twice the corresponding estimate for mechanical aerators as known to the prior art. Conventional submerged diffusers would require four times the energy to transfer the same amount of oxygen per day. Hence, it is seen once again that applicant's process is vastly improved not only with regard to the rate and efficiency of transfer of dissolved oxygen, but also with regard to energy conservation.

While in accordance with the patent statutes, details of the preferred embodiments have been illustrated and described in detail, applicant's invention is to be limited by the attached claims.

What is claimed is:

1. An apparatus for dissolving a gas in a liquid, comprising,
   an eductor, said eductor having an inlet portion, an outlet portion, and a throat portion,
   said throat portion located at the junction of said inlet portion and said outlet portion,
   said inlet portion having an inward convergence towards said throat,
   said outlet portion having an outward divergence away from said throat,
   a diffuser for carrying at least a gas, said diffuser being a conduit and having a tip,
   said diffuser extending through said eductor inlet portion, through said throat portion, and into said outlet portion,
   said throat portion diameter ranging from about 2 to about 4 times the diameter of said diffuser,
   said diffuser tip extending into said outlet portion a distance of from about 0.25 to about 0.5 throat diameters, and
   said diffuser emitting said gas through said diffuser tip into said outlet portion.

2. An apparatus according to claim 1 wherein said outward divergence ranges a total of from about 10° to about 30°.

3. An apparatus according to claim 2 wherein said diffuser diameter ranges from about ¼ inch to about 20 inches.

4. An apparatus according to claim 3 wherein said inlet convergence ranges a total of from about 30° to about 90° C.

5. An apparatus according to claim 4 wherein said diffuser diameter ranges from about 1 inch to about 12 inches and said diffuser tip extension ranges from about 0.35 to about 0.39 throat diameters.

6. An apparatus according to claim 5 wherein said outlet divergence is about a total of 14°, said throat diameter is about 3 times the diameter of said tip, and said tip extension is about 0.375 throat diameters.

7. An apparatus according to claim 6 wherein said eductor is inclined to produce circulation of said liquid.

8. An apparatus for dissolving a gas in a liquid, comprising,
   an eductor, said eductor having an inlet portion, an outlet portion, and a throat portion,
   said throat portion located at the junction of said inlet portion and said outlet portion,
   said inlet portion having an inward convergence towards said throat,
   said outlet portion having an outward divergence away from said throat,
   a diffuser for carrying at least a gas, said diffuser being a conduit and having a tip,
   said diffuser extending through said eductor inlet portion, through said throat portion, and into said outlet portion,
   said throat portion diameter ranging from about 2 to about 4 times the diameter of said diffuser,
   said diffuser tip extending into said outlet portion a distance of from about 0.25 to about 0.5 throat diameters,
   said diffuser emitting said gas through said diffuser tip into said outlet portion, and
   including a high turbulence mixing device located at least 40 diameters downstream from said diffuser, said high turbulence mixing device mixing a gas in a liquid.

9. An apparatus according to claim 8 wherein said high turbulence mixing device is located in a conduit, said conduit carrying said liquid is attached to said diffuser.

10. An apparatus according to claim 9 wherein said high turbulence mixing device is a flat plate orifice, an injection tube for carrying a gas, said injection tube having a tip, said tip extending downstream through said flat plate orifice and injecting said gas into said liquid.

11. An apparatus according to claim 10 wherein said injection tube tip is located from about 0.25 to about 0.5 conduit diameters downstream and said flat plate orifice diameter ranges from about 0.5 to about 0.95 conduit diameters.

12. An apparatus according to claim 11 wherein said injection tube tip is located from about 0.37 to about 0.39 conduit diameters downstream and said flat plate orifice diameter ranges from about 0.8 to about 0.95 conduit diameters.

13. An apparatus according to claim 11, wherein said eductor throat diameter ranges from about 2 to about 4 times the diameter of said diffuser.

14. An apparatus according to claim 13, wherein said diffuser diameter ranges from about ¼ inch to about 20 inches.

15. An apparatus according to claim 14, wherein said gas is air and said liquid is selected from the class consisting of water, waste water, and combinations thereof, the amount of air added to said liquid in said conduit ranges from about 0.1 to about 5.0 times the saturation limit of said air in said liquid.

16. An apparatus according to claim 14, wherein said gas is oxygen and said liquid is selected from the class consisting of water, waste water, and combinations thereof, the amount of said oxygen added to said liquid and said conduit ranges from about 0.5 to about 4.0 times the saturation limit of said oxygen in said liquid.

17. An apparatus according to claim 14, wherein the amount of gas ranges from about 0.1 to about 5.0 times the saturation limit of said gas in said liquid.

18. An apparatus according to claim 17, wherein said gas is selected from the class consisting of air, oxygen, sulfur dioxide, ozone, carbon diozide, chlorine, ozone in air, ozone in oxygen, and combinations thereof.

19. An apparatus according to claim 14, wherein said eductor inlet portion has a total convergence of from about 30° to about 90°.

20. An apparatus according to claim 19, wherein said eductor diffuser has a diameter of from about 1 inch to about 12 inches and said diffuser tip extension ranges from about 0.35 to about 0.39 throat diameters.

21. An apparatus according to claim 20, wherein said gas is air and said liquid is selected from the class consisting of water, waste water, and combinations thereof, the amount of said air added to said liquid in said conduit ranges from about 0.1 to about 5.0 times the saturation limit of said air in said liquid.

22. An apparatus according to claim 20, wherein said gas is oxygen and said liquid is selected from the class consisting of water, waste water, and combinations thereof, the amount of said oxygen added to said liquid ranging from about 0.5 to about 4.0 times the saturation limit of said oxygen in said liquid.

23. An apparatus according to claim 20, wherein said injector tip extends from about 0.37 to about 0.39 conduit diameters downstream and said flat plate orifice diameter ranges from about 0.8 to about 0.95 conduit diameters.

24. An apparatus according to claim 23, wherein said eductor outlet portion has a total divergence of about 14°, said throat diameter is about 3 times the diameter of said diffuser, and said diffuser tip extensions is about 0.375 throat diameters.

25. An apparatus according to claim 19, wherein said eductor is inclined to produce circulation of said liquid.

26. An apparatus according to claim 11, wherein said amount of gas ranges from about 0.1 to about 5.0 times the saturation limit of said gas in said liquid.

27. An apparatus according to claim 26, wherein said gas is air and said liquid is selected from the class consisting of water, waste water, and combinations thereof, the amount of said air added to said liquid in said conduit ranges from about 0.1 to about 5.0 times the saturation limit of said air in said liquid.

28. An apparatus according to claim 11, wherein said gas is oxygen and said liquid is selected from the class consisting of water, waste water, and combinations thereof, the amount of said oxygen added to said liquid ranging from about 0.5 to about 4.0 times the saturation limit of said oxygen in said liquid.

29. An apparatus according to claim 11, including a conduit intake, said conduit intake located in said liquid at a position below said eductor diffuser tip.

30. An apparatus according to claim 29, wherein said conduit intake is located at a position of 2 feet or greater below said diffuser tip.

31. An apparatus according to claim 29, including a plurality of said eductors.

32. An apparatus according to claim 31, wherein said conduit intake is located at a position of 2 feet or greater below said diffuser tip.

33. An apparatus according to claim 30, wherein said eductor is located in an aerobic unit equilization basin and said eductor is inclined.

34. An apparatus according to claim 32, wherein said eductors are located in an aerobic unit equilization basin and said eductors are inclined.

35. A method for dissolving a gas in a liquid, comprising, the steps of:
providing an eductor, said eductor having an inlet portion, an outlet portion, and a throat portion, said throat portion located at the junction of said inlet portion and said outlet portion, said inlet portion having an inward convergence towards said throat, said outlet portion having an outward divergence away from said throat,
a diffuser for carrying at least a gas, said diffuser being a conduit and having a tip,
locating said diffuser so that it extends through said inward portion, through said throat portion, and into said outlet portion,
said throat portion diameter ranging from about 2 to about 4 times the diameter of said diffuser,
locating said diffuser tip in said outlet portion at a distance of from about 0.25 to about 0.5 throat diameters, and
emitting at least a gas from said diffuser tip so that a mixing action extends through said outlet portion of said eductor.

36. A method according to claim 35, wherein said outward divergence ranges from a total of from about 10° to about 30°.

37. A method according to claim 36, wherein said inlet convergence ranges a total of from about 30° to about 90°, and said diffuser tip extension ranges from about 0.35 to about 0.39 throat diameters.

38. A method according to claim 37, wherein said outlet divergence is about a total of 14°, said throat diameter is about 3 times the diameter of said tip, and said tip extension is about 0.375 throat diameters.

39. A method according to claim 35, including injecting a gas into a liquid in the vicinity of a flat plate orifice located at least 40 diameters upstream from said diffuser to produce a gas-liquid mixture, and feeding said gas-liquid mixture to said diffuser, wherein said gas is injected through an injection tube, said injection tube having a tip, said high turbulence mixing device being a flat plate orifice, said injection tube tip extending downstream through said flat plate orifice and is located from about 0.25 to about 0.50 conduit diameters downstream, said flat plate orifice located in a conduit, said flat plate orifice diameter ranging from about 0.5 to about 0.95 conduit diameters.

40. A method according to claim 39, wherein said injection tube tip is located from about 0.37 to about 0.39 conduit diameters downstream and said flat plate orifice diameter ranges from about 0.8 to about 0.95 conduit diameters.

41. A method according to claim 39, wherein the amount of gas injected into said liquid ranges from about 0.1 to about 5.0 times the saturation limit of said gas in said liquid.

42. A method according to claim 39, wherein said gas is air and said liquid is selected from the class consisting of water, waste water, and combinations thereof.

43. A method according to claim 39, wherein said gas is oxygen, and said liquid is selected from the class consisting of water, waste water, and combinations thereof.

44. A method according to claim 39, wherein said eductor throat diameter ranges from about 2 to about 4 times the diameter of said diffuser.

45. A method according to claim 44, wherein the eductor diffuser has a diameter of about 1 inch to about 12 inches and said diffuser tip extension ranges from about 0.35 to about 0.39 throat diameters.

46. A method according to claim 45, wherein said injection tip extends from about 0.37 to about 0.39 conduit diameters downstream and said flat plate orifice diameters ranges from about 0.8 to about 0.95 conduit diameters.

47. A method according to claim 46, wherein said eductor outlet portion has a total divergence of about 14°, said throat diameter is about 3 times the diameter of said diffuser, and said diffuser tip extension is about 0.375 throat diameters.

48. A method according to claim 44 including the step of including said eductor to produce momentum mixing and to induce circulation.

49. A method according to claim 48, wherein said inclination produces a standing vortex circulation.

50. A method according to claim 44, wherein the amount of gas injected into said liquid ranges from about 0.1 to about 5.0 times the saturation limit of said gas in said liquid.

51. A method according to claim 50, including the step of inclining said eductor to produce momentum mixing and to induce circulation.

52. A method according to claim 51, wherein said inclination produces a standing vortex circulation.

53. A method according to claim 44, wherein said gas is air and said liquid is selected from the class consisting of water, waste water, and combinations thereof.

54. A method according to claim 53, including a conduit intake, said conduit intake is located in said liquid at a point below said diffuser tip.

55. A method according to claim 54, wherein said conduit intake is located at a point 2 feet or greater below said diffuser tip.

56. A method according to claim 44, wherein said gas is oxygen, and said liquid is selected from the class consisting of water, waste water, and combinations thereof.

57. A method according to claim 56, including the step of inclining said eductor to produce momentum mixing and to induce circulation.

58. A method according to claim 57, wherein said inclination produces a standing vortex circulation.

59. A method according to claim 56, including the conduit intake, said conduit intake located at a point below said diffuser tip.

60. A method according to claim 59, wherein said conduit intake is located at a point 2 feet or greater below said diffuser tip.

61. A method according to claim 59, including the step of inclining said eductor to produce momentum mixing and to induce circulation.

62. A method according to claim 61, wherein said inclination produces a standing vortex circulation.

63. A method for dissolving a gas in a liquid, comprising, the steps of:
providing an eductor, said eductor having an inlet portion, an outlet portion, and a throat portion, said throat portion located at the junction of said inlet portion and said outlet portion, said inlet portion having an inward convergence towards said throat, said outlet portion having an outward divergence away from said throat,
a diffuser for carrying at least a gas, said diffuser being a conduit and having a tip,
locating said diffuser so that it extends through said inward portion, through said throat portion, and into said outlet portion,
said throat portion diameter ranging from about 2 to about 4 times the diameter of said diffuser,
locating said diffuser tip in said outlet portion at a distance of from about 0.25 to about 0.5 throat diameters,
emitting at least a gas from said diffuser tip so that a mixing action extends through said outlet portion of said eductor, and
including injecting a gas into a liquid in the vicinity of a highturbulence mixing device located at least 40 diameters upstream from said diffuser to produce a gas-liquid mixture, and feeding said gas-liquid mixture to said diffuser.

* * * * *